United States Patent
Hiraishi et al.

[19]

[11] Patent Number: 5,831,708
[45] Date of Patent: Nov. 3, 1998

[54] LIQUID CRYSTAL DISPLAY WITH A SCANNING LINE HAVING A RING SHAPED REDUNDANT SECTION AND METHOD FOR FABRICATING THE SAME

[75] Inventors: Youichi Hiraishi, Tenri; Yasunobu Tagusa, Ikoma; Tadanori Hishida, Kashihara, all of Japan

[73] Assignee: Sharp Kabushiki Kaisha, Osaka, Japan

[21] Appl. No.: 705,759

[22] Filed: Aug. 30, 1996

[30] Foreign Application Priority Data

Sep. 28, 1995 [JP] Japan .................................. 7-251098
Dec. 25, 1995 [JP] Japan .................................. 7-336696
Aug. 8, 1996 [JP] Japan .................................. 8-210271

[51] Int. Cl.$^6$ ........................ G02F 1/1343; G02F 1/1333
[52] U.S. Cl. ........................... 349/143; 349/54; 349/39; 349/148
[58] Field of Search ................. 349/54, 143, 55, 349/38, 39, 148

[56] References Cited

U.S. PATENT DOCUMENTS

| | | | |
|---|---|---|---|
| 4,728,175 | 3/1988 | Baron | 349/38 |
| 4,961,630 | 10/1990 | Baron et al. | 349/38 |
| 5,028,122 | 7/1991 | Hamada et al. | 350/333 |
| 5,032,883 | 7/1991 | Wakai et al. | 257/59 |
| 5,042,918 | 8/1991 | Suzuki | 349/143 |
| 5,054,887 | 10/1991 | Kato et al. | 349/143 |
| 5,066,106 | 11/1991 | Sakamoto et al. | 349/54 |
| 5,166,085 | 11/1992 | Wakai et al. | 438/158 |
| 5,212,574 | 5/1993 | Katayama et al. | 349/148 |
| 5,247,289 | 9/1993 | Matsueda | 349/143 |
| 5,286,983 | 2/1994 | Sakamoto et al. | 349/38 |
| 5,302,987 | 4/1994 | Kanemori et al. | 349/143 |
| 5,526,014 | 6/1996 | Shiba et al. | 345/96 |
| 5,585,647 | 12/1996 | Nakajima et al. | 349/42 |
| 5,585,951 | 12/1996 | Noda et al. | 349/122 |
| 5,621,555 | 4/1997 | Park | 349/54 |
| 5,641,974 | 6/1997 | den Boer et al. | 257/59 |
| 5,648,826 | 7/1997 | Song et al. | 349/42 |
| 5,682,211 | 10/1997 | Yao et al. | 349/38 |
| 5,686,977 | 11/1997 | Kim et al. | 349/143 |

FOREIGN PATENT DOCUMENTS

| | | |
|---|---|---|
| 61-156025 | 7/1986 | Japan . |
| 135351 | 7/1989 | Japan . |
| 4307521 | 10/1992 | Japan . |
| 474714 | 11/1992 | Japan . |
| 6230422 | 8/1994 | Japan . |

OTHER PUBLICATIONS

Sakamoto et al: "27.3: A High–Aperture–Ratio 3–in.–Diagonal VGA a–Si Light Valve with Pixel/Data and Pixel/Gate Lines Overlapping," *SID 96 Digest*, pp. 681–684, 1996.

"High–Aperature and Fault–Tolerant Pixel Structure for TFT–LCDs" (S.S. Kim et al, Society for Information Display International Symposium Digest of Technical Papers, May, 1995, pp. 15–18).

Fujita et al, "Colorless Polymide", Nitto Giho, vol. 29, No. 1, Jun. 1991, pp. 20–28.

*Primary Examiner*—Anita Pellham Gross
*Assistant Examiner*—Tarifur R. Chowdhury
*Attorney, Agent, or Firm*—Nixon & Vanderhye PC

[57] ABSTRACT

On an active matrix substrate having a TFT in the vicinity of the intersection of a gate line and a source line and a pixel electrode connected to the TFT, an inter-layer insulating film is formed by an acrylic resin, for example, between the pixel electrode and the gate line, source line and TFT. The pixel electrode does not overlap a self gate line, but overlaps a gate line adjacent to the self gate line. At least one of the gate line and the source line has a redundant structure including ring-shaped sections connected in a longitudinal direction so as to provide redundancy as a measure to counter the disconnection of lines.

39 Claims, 15 Drawing Sheets

F I G. 13(a)
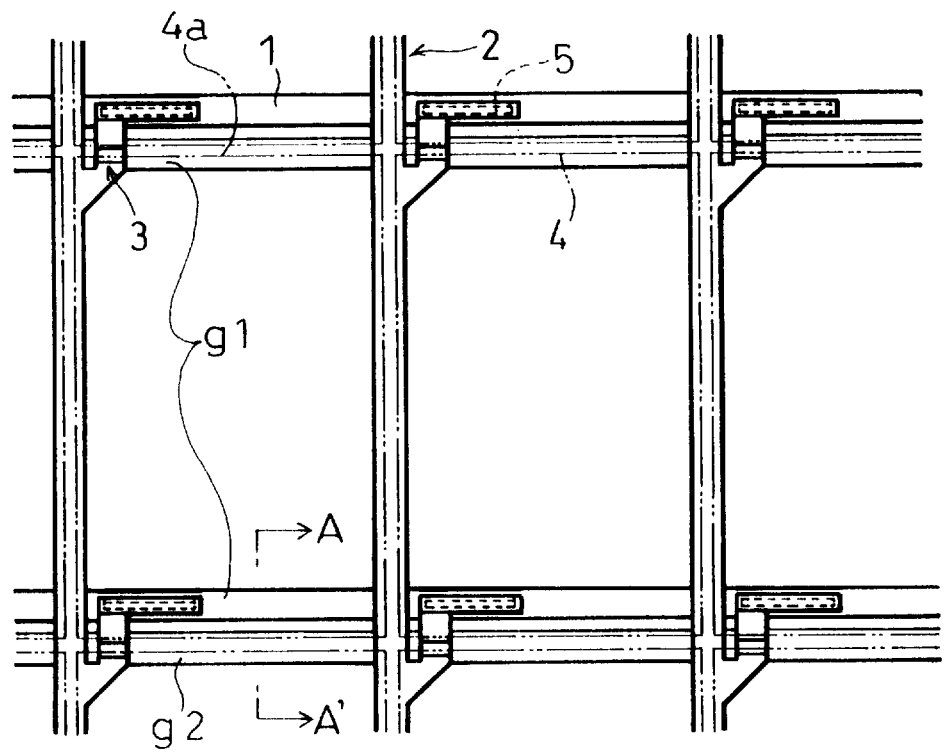
F I G. 13(b)
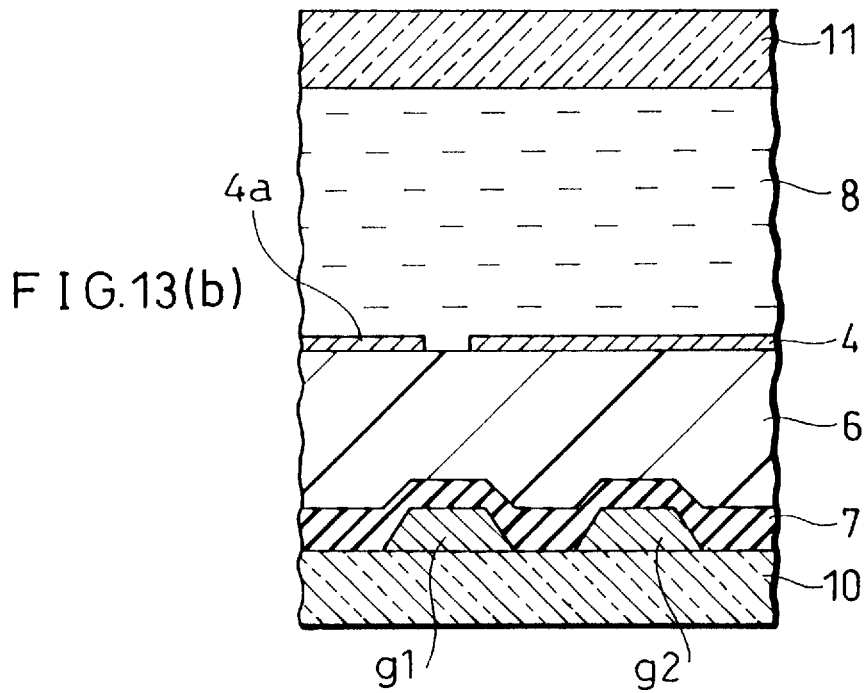

5,831,708

LIQUID CRYSTAL DISPLAY WITH A SCANNING LINE HAVING A RING SHAPED REDUNDANT SECTION AND METHOD FOR FABRICATING THE SAME

RELATED APPLICATIONS

This application is related to the following commonly assigned applications: Ser. No. 08/695,632, filed Aug. 12, 1996; Ser. No. 08/712,978, filed Sep. 12, 1996; Ser. No. 08/700,172, filed Aug. 20, 1996; Ser. No. 08/697,277, filed Aug. 27, 1996; and Ser. No. 08/725,663, filed Oct. 1, 1996; and Ser. No. 08/720,152 filed Sep. 25, 1996.

FIELD OF THE INVENTION

The present invention relates to an active-matrix type liquid crystal display element including a switching element such as a thin-film transistor (TFT), a method for fabricating the same, and a liquid crystal display device using the liquid crystal display element.

BACKGROUND OF THE INVENTION

FIG. 14(a) is a plan view showing the structure of an active matrix substrate of a liquid crystal display element used in a conventional transmissive liquid crystal display device. As illustrated in FIG. 14(a), a plurality of pixel electrodes 54 are placed in a matrix form on the active matrix substrate. Gate lines 51 and source lines 52 are arranged to run around the pixel electrodes 54 and cross each other at right angles.

In this case, the gate line 51 is arranged in a ring shape to enclose a display area in which the pixel electrode 54 is formed. Such a redundant structure is adopted as a measure to counter the disconnection of lines. A portion of the gate line 51 overlaps a peripheral portion of the pixel electrode 54, and the overlapped section is used as storage capacitor ($C_s$). In this case, the pixel electrode 54 is formed on the next gate line 51, producing a so-called "$C_s$-on-gate" structure.

Disposed at the intersection of the gate line 51 and the source line 52 is a TFT 53 as a switching element to be connected to the pixel electrode 54. The gate line 51 is connected to the gate electrode of the TFT 53 so that the TFT 53 is driven in a controlled manner by a signal input to the gate electrode. On the other hand, the source line 52 is connected to the source electrode of the TFT 53 so that a data signal is input through the source electrode to the TFT 53.

FIG. 14(b) is a sectional view showing a cross section of the liquid crystal display element cut along the plane A–A' in FIG. 14(a). As shown in FIG. 14(b), the gate lines 51 explained in FIG. 14(a) are arranged on a TFT substrate 60, and a gate insulating film 57 is formed to cover the gate lines 51. In addition, the source line 52 and the pixel electrode 54 explained in FIG. 14(a) are formed on the gate insulating film 57. A liquid crystal 58 is sandwiched between the TFT substrate 60 and a counter substrate 61 having a black matrix (BM) 62 formed thereon so as to fabricate a transmissive liquid crystal display element.

Like the conventional liquid crystal display element, if the source line 52 (or the gate line 51) and the pixel electrode 54 are formed in the same layer, it is necessary to have a space between the source line 52 and the pixel electrode 54 in a direction horizontal to the layer surface. The reason for this is that when the source line 52 and the pixel electrode 54 are formed close to each other, the aperture ratio is improved, but the probability of leakage between the source line 52 and the pixel electrode 54 becomes higher. Another problem is that disclination occurs, lowering the display quality of the liquid crystal display element. For the reasons mentioned above, it is extremely difficult to achieve a significant improvement of the aperture ratio in a conventional liquid crystal display element.

A transmissive liquid crystal display element shown in FIG. 15 can be achieved using a TFT disclosed in Japanese Publication for Unexamined Patent Application No. (Tokukaisho) 64-68726 (U.S. Pat. No. 5,032,883). In this device, an inter-layer insulating film 76 made of polyimide (Pi), an acrylic resin, or the like, is placed between a pixel electrode 74 and gate and source lines 71 and 72. Namely, the pixel electrode 74 and the gate and source line 71 and 72 are formed as separate layers. In this structure, since the gate line 71 and the source line 72 can be formed close to each other, it is possible to achieve a higher aperture ratio than that of the conventional liquid crystal display element.

However, in the structure using the TFT disclosed in the above-mentioned publication, since the pixel electrode 74 is formed on the gate line 71 for driving the pixel electrode 74, a parasitic capacitance ($C_{gp}$) is produced between the pixel electrode 74 and the gate line 71. Furthermore, a direct current component of the gate is applied to the liquid crystal, causing a problem that the display quality of the liquid crystal display element is lowered. In addition, the formation of storage capacitor ($C_s$) is not disclosed at all in the above publication.

In the structure of this publication, a transparent electrode is not provided on the TFT. Such a structure may cause polarization of the inter-layer insulating layer 76, and a shift in the characteristics of the TFT. This phenomenon is particularly prominent when an organic film is used as the inter-layer insulating film 76.

SUMMARY OF THE INVENTION

It is the first object of the present invention to provide a liquid crystal display element which achieves an improvement of the aperture ratio, and a high-quality display by reducing the parasitic capacitance between pixel electrodes and lines and by forming a greater capacitor.

It is the second object of the present invention to improve the reliability, life and display quality of a liquid crystal display element by preventing a shift in the characteristics of a switching element.

In order to achieve the first object, a liquid crystal display element of the present invention includes:

a switching element in the vicinity of the intersection of a scanning line and a signal line; and a pixel electrode connected to the switching element, wherein at least one of the scanning line and the signal line has ring-shaped redundant sections, and an inter-layer insulating film is provided between the pixel electrode and the scanning line, signal line and switching element.

In this structure, since the inter-layer insulating film is formed between the pixel electrode and the scanning and signal lines, if the scanning line has redundant sections, it is possible to locate the signal line and a portion of the redundant section of the scanning line, which is parallel to the signal line, close to each other. As a result, the aperture ratio is improved. Moreover, since at least one of the scanning line and the signal line has ring-shaped redundant structures, a great storage capacitor is formed. Further, since the redundancy as a measure to counter the disconnection of lines is enhanced, it is possible to improve the non-defective product ratio. Additionally, since a smaller line width is achieved, the aperture ratio is further improved.

It is preferred to arrange the pixel electrode in the liquid crystal display element so that the pixel electrode does not overlap a self scanning line and has a portion which overlaps a scanning line adjacent to the self scanning line. In this arrangement, since the pixel electrode does not overlap the scanning line which is electrically connected to the pixel electrode, no parasitic capacitance ($C_{gp}$) is present, thereby improving the display quality.

With the use of an organic resin as the inter-layer insulating film in the liquid crystal display element, the surface of the inter-layer insulating film can be easily flattened. As a result, disorderly alignment of the liquid crystal in the liquid crystal display element is significantly reduced, and therefore the display quality is improved and the viewing angle is widened. Moreover, the use of the organic film produces the effect of improving the contrast ratio.

With the use of an acrylic resin as the inter-layer insulating film in the liquid crystal display element, the liquid crystal display element achieves a colorless fine display.

In the liquid crystal display element, if adjacent redundant sections are arranged to have a common portion, the difference in the thickness at the intersection of the scanning line and the signal line is reduced, thereby preventing disconnection of lines. In addition, the aperture ratio can further be improved.

In the liquid crystal display element, if the scanning line is arranged to have ring-shaped redundant sections and a portion of the redundant section which is parallel to the signal lines is arranged to have a line width equal to or less than a line width of the signal line, the aperture ratio can further be improved.

In the liquid crystal display element, if the scanning line is arranged to have ring-shaped redundant sections, and a capacitor line for forming a storage capacitor is provided on a portion of the redundant section which crosses the signal line at a right angle, it is possible to reduce the thickness of an insulating film between the pixel electrode and the scanning line, and form a great storage capacitor. Moreover, since the resistance of the scanning line is decreased, the display quality of the liquid crystal display element is further improved.

In the liquid crystal display element, if the scanning line is arranged to have ring-shaped redundant sections and the inter-layer insulating film is arranged to have a contact hole through which the switching element and the pixel electrode are electrically connected above a portion of the redundant section which crosses the signal line at a right angle, disorderly alignment of the liquid crystal which tends to occur at the position of the contact hole can be hidden by the scanning line, thereby preventing a lowering of the display quality. Moreover, since the necessity of additionally forming a light blocking film at the position of the contact hole is eliminated, the aperture ratio can be improved.

Furthermore, if one of portions of the redundant section which lie to cross the signal line at right angles, is made thicker than the other portion and the inter-layer insulating film located on the one portion is arranged to have a contact hole, the area of the contact hole can be increased. Thus, this arrangement reduces the incidence of connection defect, and decreases the connection resistance. This arrangement also allows a great storage capacitor.

In the liquid crystal display element, if a metal oxide film is formed on the surface of the scanning line by anodic oxidation, for example, it is possible to form a great storage capacitor and improve the insulating properties of a semiconducting layer which affects the characteristics of the switching element.

In the liquid crystal display element, if an insulating film for forming a storage capacitor is provided between the scanning line and a contact electrode of the switching element, the storage capacitor is formed by the insulating film. Since the insulating film is thinner than the inter-layer insulating film and usually has a large relative permittivity, it is possible to form a greater storage capacitor.

In the liquid crystal display element, if the scanning line is formed in a layer higher than the signal line, the space between the scanning line and the pixel electrode is reduced, thereby forming a great storage capacitor.

In order to achieve the second object, another liquid crystal display element of the present invention includes:

a switching element in the vicinity of the intersection of a scanning line and a signal line;

a pixel electrode which is formed on the inter-layer insulating film and connected to the switching element; and an auxiliary electrode formed on the inter-layer insulating film to cover the switching element. This structure prevents a shift in the characteristics of the switching element. Consequently, it is possible to provide a liquid crystal display element which is highly reliable and achieves clear display without cloudiness.

For a fuller understanding of the nature and advantages of the invention, reference should be made to the ensuing detailed description taken in conjunction with the accompanying drawings.

BRIEF DESCRIPTION OF THE DRAWINGS

FIG. 13(a) is a plan view showing the structure of an active matrix substrate of a liquid crystal display element used in a liquid crystal display device according to Embodiment 9 of the present invention, and FIG. 13(b) is a sectional view showing a cross section of the liquid crystal display element cut along the A–A' plane in FIG. 13(a).

DESCRIPTION OF THE PREFERRED EMBODIMENTS

[Embodiment 1 ]

Figure 1A:
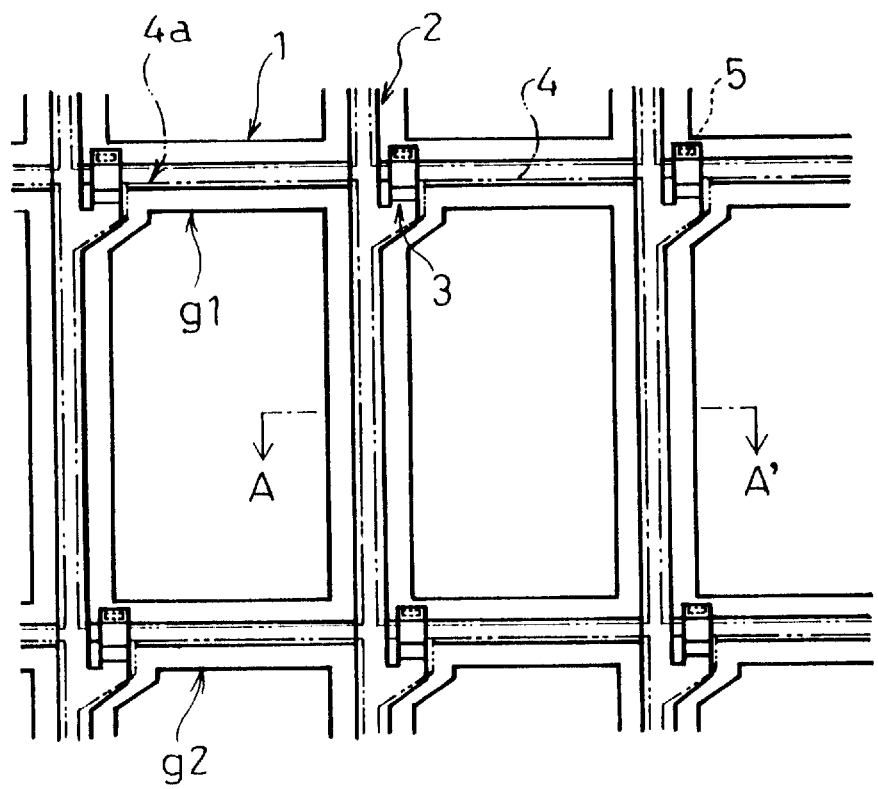
FIG. 1(*a*) is a plan view showing the structure of an active matrix substrate of a liquid crystal display element used in a liquid crystal display device according to Embodiment 1 of the present invention, and FIG. 1(*b*) is a sectional view showing a cross section of the liquid crystal display element cut along the A–A' plane in FIG. 1(*a*)

FIG. 1(a) is a plan view showing the structure of an active matrix substrate of a liquid crystal display element used in a liquid crystal display device according to Embodiment 1 of the present invention.

As illustrated in FIG. 1(a), a plurality of pixel electrodes 4 made of a transparent material, for example, ITO, are placed in a matrix form on an active matrix substrate. A gate line 1 as a scanning line and a source line 2 as a signal line are arranged to run the periphery of the pixel electrodes 4 and to cross each other at a right angle. The gate line 1 is made of a metal which is not transparent, such as Al, Ta and Cr. The source line 2 is made of a metal such as Al, Ta and Cr, or ITO. As to be explained later, the gate line 1 has a form in which ring-shaped sections enclosing each of the pixel electrodes, 4 (the display area) are connected to provide redundancy as a measure to counter the disconnection of lines.

The gate line 1 is arranged so that at least a portion thereof overlaps the pixel electrode 4, and a storage capacitor ($C_s$) is formed at the overlapped section. It is preferred to arrange the pixel electrode 4 to substantially entirely overlap the gate line 1. This arrangement allows an increase in the storage capacitor ($C_s$), and prevents the application of a direct current component to a liquid crystal 8 from the gate line 1, thereby improving the life and the reliability of the liquid crystal display device.

Figure 1B:
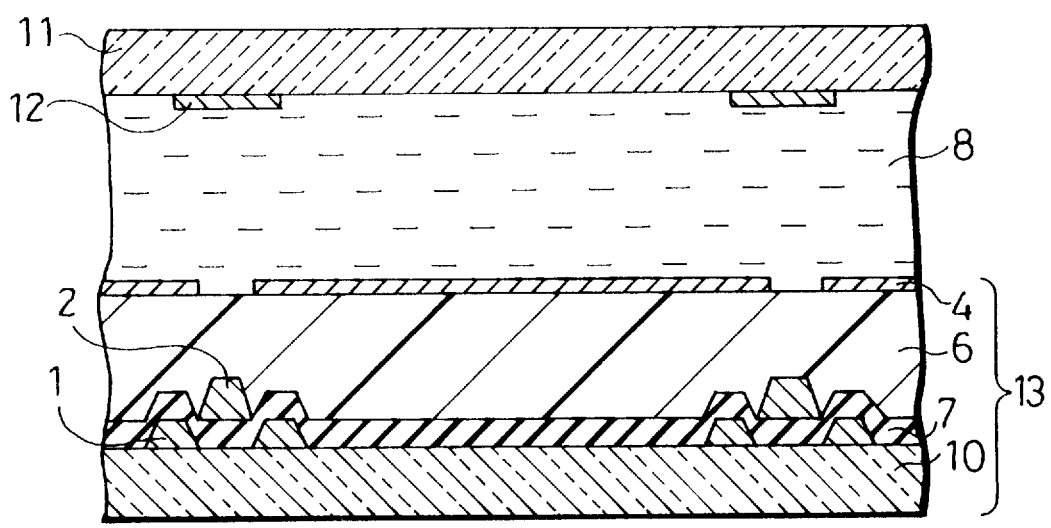

In this case, the pixel electrode 4 has a so-called "$C_s$ on gate" structure in which the pixel electrode 4 is formed on the next gate line. More specifically, suppose one of a plurality of pixel electrodes 4 shown in FIG. 1(a) is named 4a, the pixel electrode 4a is not driven by a gate line 1 (a gate line indicated by gi in FIG. 1(a)) which overlaps the pixel electrode 4a, but is driven by a gate line 1 (a gate line indicated by g2 in FIG. 1(b)) next to the gate line g1. In the following explanation, the gate line which drives each pixel electrode 4 like the gate line g2 drives the pixel electrode 4a will be referred to as "the self gate line".

Next, the pattern of the gate lines 1 will be explained. For instance, the gate lines 1 can form patterns shown in FIGS. 3(a) to 3(c). As illustrated in FIG. 3(a), for example, the gate line 1 is constructed by connecting ring-shaped sections R (hereinafter referred to as "ring sections") enclosing each of the pixel electrodes 4 successively in the longitudinal direction of the gate line 1. The ring section R is named the redundant section of the gate line 1. The gate line 1 having such a redundant section can hardly cause a connection defect even when disconnection of lines occurs at some portions.

In the structure shown in FIG. 3(a), adjacent ring sections R are connected to each other at both ends in a direction parallel to the source line 2. Thus, the gate line 1 as a whole forms a ladder-like structure. This structure will be referred to as "the ladder structure". An advantage of the ladder structure is that since adjacent ring sections R are connected to each other at two points, i.e., at both ends in a direction parallel to the source line 2, a connection defect does not occur unless the both of the connection points are disconnected.

The gate line 1 shown in FIG. 3(b) is also constructed by connecting the ring sections R enclosing each pixel electrode 4 successively in the longitudinal direction of the gate line 1. However, this is not a complete ladder structure, and adjacent ring sections R are connected to each other at one of the ends thereof in a direction parallel to the source line 2. As a modified example of the structure shown in FIG. 3(b), it is possible to connect adjacent ring sections R to each other near the center thereof in a direction parallel to the source line 2.

In the structure of the gate line 1 shown in FIG. 3(c), adjacent ring sections R have a common portion parallel to the source line 2. The detail of this structure will be explained in Embodiment 2. The structure of FIG. 3(c) is designed to achieve a improved aperture ratio compared to those of FIGS. 3(a) and 3(b).

All of the line structures having ring-shaped redundant sections exemplified in FIGS. 3(a) to 3(c) will be referred to as "the redundant structure". It is not necessary to form the ring-shaped section to enclose the pixel electrode and, for example, a portion of the ring-shaped section may pass through the center of the pixel electrode.

Mounted in the vicinity of the intersection of the above-mentioned gate line 1 and source line 2 is a TFT 3 as a switching element connected to the pixel electrode 4 through a contact hole 5. In this case, the gate line 1 also functions as the gate electrode of the TFT 3, and the TFT 3 is driven in a controlled manner by a signal input to the gate electrode. On the other hand, the source line 2 is connected to the source electrode of the TFT 3, and a data signal is input to the source electrode of the TFT 3.

FIG. 1(*b*) is a sectional view showing a cross section of a liquid crystal display element of this embodiment cut along the A–A' plane in FIG. 1(*a*). As illustrated in FIG. 1(*b*), the liquid crystal display element is constructed by placing the liquid crystal 8 between an active matrix substrate 13 and a counter substrate 11.

First, the structure of the active matrix substrate 13 will be explained. The active matrix substrate 13 is fabricated by layering a TFT substrate 10, the gate line 1, a gate insulating film 7, the source line 2, an inter-layer insulating film 6, and the pixel electrode 4 in this order. More specifically, the gate line 1 is arranged on the TFT substrate 10, and the gate insulating film 7 is formed by $SiN_x$ or $SiO_x$ to cover the top of the gate line 1. The source line 2 is arranged on the gate insulating film 7. Moreover, the inter-layer insulating film 6 is formed by an acrylic resin or Pi (polyimide) to cover the source line 2. The thickness of the inter-layer insulating film 6 is within a range of preferably from 1 μm to 5 μm, more preferably from 2 μm to 3 μm.

The reasons for setting the film thickness of the inter-layer insulating film 6 within the above-mentioned range are as follows. (1) It is necessary to make the film thickness of the inter-layer insulating film 6 thicker than the film thickness of the lines in order to achieve a flat surface of the inter-layer insulating film 6. (2) When the pixel electrode 4 and the source line 2 overlap, it is desirable to reduce a parasitic capacitance ($C_{sp}$) formed in the overlapped section.

However, if the inter-layer insulating film 6 is too thick, the area of the contact hole 5 increases. For instance, when the film thickness of the inter-layer insulating film 6 is 6 μm, the bottom surface (connected section) of the contact hole 5 is 5 μm square, and the cone angle of the contact hole 5 is 60 degrees, the size of the opening of the contact hole 5 in the surface of the inter-layer insulating film 6 is not smaller than 13 μm square. Alternatively, when the cone angle of the contact hole 5 is 45 degrees, the size of the opening is not smaller than 16 82 m square. Such an increase in the size of the opening causes problems, including disordered alignment of liquid crystal, contact defects, and an increase in the time taken for forming the inter-layer insulating film 6.

Subsequently, the pixel electrode 4 is placed on the inter-layer insulating film 6 thus formed. As a result, the active matrix substrate 13 is completed. On the other hand, a black matrix (BM) 12, and a common electrode and a color filter (not shown) are formed on the counter substrate 11 facing the active matrix substrate 13. The liquid crystal 8 is placed between the active matrix substrate 13 and the counter substrate 11, thereby completing the liquid crystal display element of this embodiment.

As is clear from the explanation above, in the structure of this embodiment, the space between the gate line 1 and the source line 2 is significantly reduced compared to a conventional liquid crystal display device. In the conventional liquid crystal display device, since the pixel electrode, the source line, and the gate line are formed in the same layer, if the pixel electrode, and the source and gate lines are arranged close to each other, leakage and disclination occur, resulting in a lowering of the non-defective product ratio and display quality of the liquid crystal display device. By contrast, in the structure of Embodiment 1, since the pixel electrode 4 and the gate and source lines 1 and 2 are formed in different layers separated by the inter-layer insulating film 6, these lines can be arranged close to each other without causing the problems associated with the conventional structure.

It is preferred to use a film having a comparatively low relative permittivity as the inter-layer insulating film 6. The relative permittivity of the inter-layer insulating film 6 is an element which greatly affects the display characteristics of the liquid crystal display device as the area of the overlapped section of the source line 2 and the pixel electrode 4 increases. The reason for this is as follows. In the structure of Embodiment 1, since the pixel electrode 4 is not formed on the self gate line, the parasitic capacitance ($C_{gp}$) is not produced between the gate line 1 and the pixel electrode 4. However, when the source line 2 and the pixel electrode 4 overlap, the parasitic capacitance ($C_{sp}$) is produced therebetween. If the parasitic capacitance ($C_{sp}$) is great, it causes a vicious effect on the display.

Figure 2:
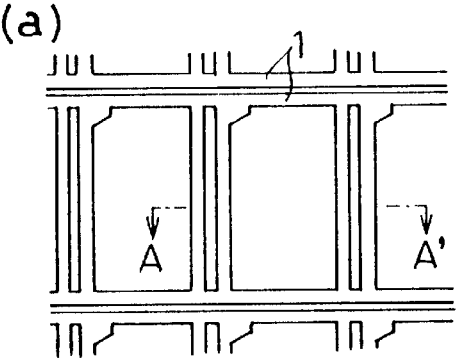
FIGS. 2(*a*) to 2(*d*) are plan views showing the structure of the active matrix substrate in respective main fabrication processes, and FIGS. 2(*e*) to 2(*h*) are sectional views showing cross sections cut along the A–A' plane in FIGS. 2(*a*) to 2(*d*), respectively.
Figure 2:
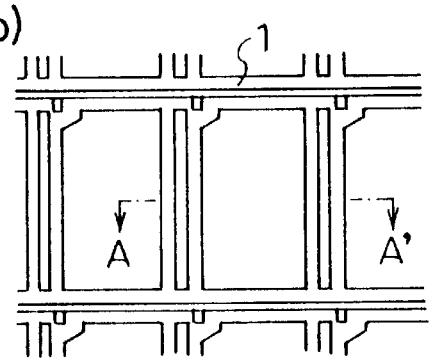
Figure 2:
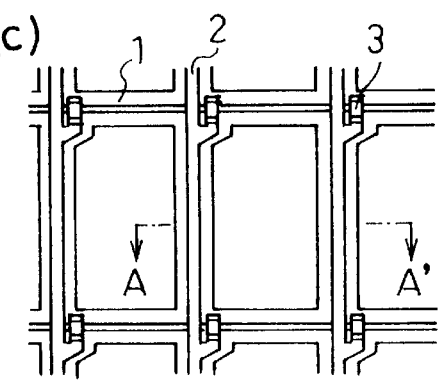
Figure 2:
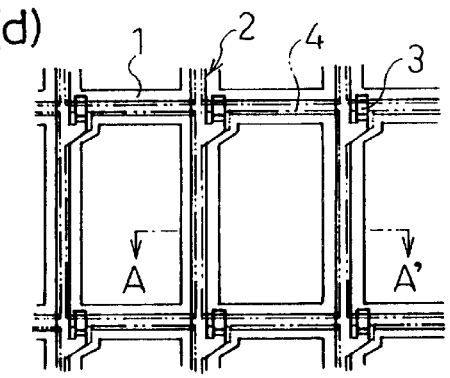
Figure 2E:
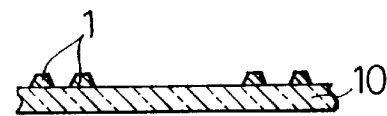
Figure 2F:
Figure 2G:
Figure 2H:
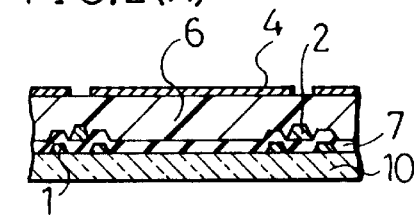

Referring now to FIGS. 2(*a*) to 2(*h*), the following description will discuss main fabrication processes of the active matrix substrate 13. FIGS. 2(*a*) to 2(*d*) are plan views showing the structure of the active matrix substrate 13 in the respective fabrication processes, and FIGS. 2(*e*) to 2(*h*) are sectional views showing cross sections thereof cut along the A–A' plane in FIGS. 2(*a*) to 2(*d*), respectively.

First, as illustrated in FIG. 2(*e*), Al is deposited to form a film having a thickness of 4000 Å on the TFT substrate 10, for example, a glass substrate, by CVD (chemical vapor deposition), and a desired pattern is formed by the Al film so as to produce the gate signal line 1. In this case, as shown in FIG. 2(*a*), the pattern is formed so that the ring-shaped sections (hereinafter referred to as "the ring sections") enclosing the periphery of the pixel electrode 4, to be formed later, are connected successively in a direction parallel to the gate line 1.

Next, only a 2000 Å thick portion from the surface of the gate line 1 is subjected to anodic oxidation so as to improve the insulation between the gate line 1 and a semiconducting layer, to be formed later, and increase the storage capacitor ($C_s$).

Thereafter, as illustrated in FIGS. 2(*b*) and 2(*f*), the gate insulating film 7 with a thickness of 3000 Å is formed on the gate line 1 by, for example, $SiN_x$ by CVD. By successively depositing a Si semiconducting layer in a thickness of 1000 Å and a n⁺Si layer in a thickness of 500 Å on the gate insulating film 7 to form a desired pattern, a channel section and a contact section (not shown) are produced.

Next, as illustrated in FIGS. 2(*c*) and 2(*g*), an Al film with a thickness of 1000 Å and a Cr film with a thickness of 3000 Å are successively deposited by CVD. By forming a desired pattern with these films, the source line 2 is produced. By forming the source line 2 with such a double-layer structure, the source line 2 can have redundancy as a measure to counter the disconnection of lines. Consequently, not only the non-defective product ratio is increased, but also the line width of the source line 2 is decreased, thereby significantly improving the aperture ratio of the liquid crystal display device.

Subsequently, as illustrated in FIGS. 2(*d*) and 2(*h*), a photosensitive acrylic resin is applied in a thickness of around 3 μm over the source line 2 by spin-coating so as to form the inter-layer insulating film 6. Here, the photosensitive acrylic resin was prepared by using polymers of methacrylic acid and glycidyl methacrylate as base polymers and adding a naphthoxydiazide-based positive sensitizing agent to the base polymers. The reasons for using the acrylic resin as the inter-layer insulating film 6 are as follows.

(1) Acrylic resin has a lower relative permittivity of from 3.0 to 4.0 than the relative permittivity (around 8) of an inorganic film, for example, $SiN_x$, which is often used as an insulating film in a prior art. Even if a sensitizing agent is added, the relative permittivity of acrylic resin is as low as 3.4 to 3.5.

(2) Acrylic resin has high transparency.

(3) Acrylic resin can be easily made into a thick film with a thickness of around 3 μm by spin-coating, roll-coating or slot-coating. Thus, the parasitic capacitance ($C_{sp}$) between the source line 2 and the pixel electrode 4 can be reduced.

For the reasons mentioned above, it is possible to minimize the effects (including crosstalk) of the parasitic capacitance ($C_{sp}$) on the display, thereby providing a bright and excellent display.

Moreover, with the use of the photosensitive acrylic resin, the necessity of applying a photoresist for forming a pattern is eliminated, thereby improving the productivity. In this case, among emission bright line spectrum of an i line (with a wavelength of 365 nm), an h line (with a wavelength of 405 nm) and a g line (with a wavelength of 436 nm) as wavelengths used for ordinary exposure, a preferred photosensitive resin has a reaction peak in the wavelength of the i line which has the strongest energy level and is not visible light but ultraviolet light. With the use of such a photosensitive resin, it is possible to form a contact hale with precision, and minimize the degree of coloring because of the presence of the peak in the ultraviolet region.

As a result, the transmittance of the transmissive liquid crystal display device is improved, and the power consumption can be lowered by reducing the amount of light from a backlight. Alternatively, if the amount of light from the backlight is the same as a conventional amount, a brighter display can be achieved.

Here, a pattern is formed by performing development with a developing solution (alkali solution) containing 0.1 to 1.0 mol % tetramethyl ammonium hydroxide. If the concentration of tetramethyl ammonium hydroxide in the development solution is not less than 1.0 mol %, the film thickness of the photosensitive transparent acrylic resin is considerably decreased at portions which are not exposed, i.e., the portions other than the contact hole, causing difficulty in controlling the film thickness. Alternatively, if the concentration of tetramethyl ammonium hydroxide in the development solution is as high as, for example, around 2.4 mol %, a modified acrylic resin residues at a portion (via hole) where the acrylic resin is to be removed by development, i.e., the portion where the contact hole is to be formed, causing a defective contact. On the other hand, if the concentration of tetramethyl ammonium hydroxide in the development solution is less than 0.1 %, in a type of development device in which the development solution is circulated for repeated use, it is difficult to control the concentration of tetramethyl ammonium hydroxide because the variation in the concentration is great. For the reasons mentioned above, the concentration of tetramethyl ammonium hydroxide in the development solution is preferably within a range of from 0.1 mol % to 1.0 mol %.

Furthermore, in this embodiment, an acrylic resin which was colored in advance is used to form a desired pattern of the inter-layer insulating film 6, and then the acrylic resin is entirely exposed to increase its transparency. In this structure, it is possible to easily form the desired pattern and improve the productivity. The acrylic resin may be made transparent by chemical treatment instead of optical treatment.

Next, the pixel electrode 4 is arranged in a matrix form by depositing ITO to form a film with a thickness of 1500 Å on the inter-layer insulating film 6 and by forming a desired pattern. In this case, prior to the formation of the pixel electrode 4, an ashing treatment is applied to an around 1000 Å to 3000 Å thick portion from the surface of the inter-layer insulating film 6 by, for example, oxygen plasma treatment using a dry etching device. In the ashing treatment, a plane parallel plasma etching device is used, and ashing is performed under such conditions that RF power is 1.2 kW, pressure is 800 mTorr, oxygen flow is 300 sccm, temperature is 70° C., and RF application time is 120 seconds.

At this time, by performing the ashing in oxygen plasma, the surface of the inter-layer insulating film 6 is roughened because water and carbon dioxide are removed by the oxidative destruction of an organic material. Such an effect is produced when ashing is applied to a film thickness of not smaller than 1000 Å. However, if the inter-layer insulating film 6 is excessively ashed, a reduction in the film thickness becomes excessive, causing a variation in the film thickness. As a result, the alignment of liquid crystal is disordered, and the display may suffer from a vicious effect. Therefore, it is preferred to control the film thickness subjected to the ashing treatment to be not more than 5000 Å, more preferably not more than 3000 Å. The effect of improving the adhesion between the inter-layer insulating film 6 and the pixel electrode 4 is produced irrespectively of the types of the dry etching device, such as barrel type and RIE type.

If this treatment is performed simultaneously with the step of removing the residue of the photosensitive resin, the number of processing steps does not increase. When the material which is not photosensitive is used as the inter-layer insulating film 6, if the ashing treatment is performed simultaneously with the step of removing the photoresist, the number of processing steps does not increase.

It is also possible to produce the same effect as the ashing treatment by roughening the surface of the inter-layer insulating film 6 by applying to the surface thereof ultraviolet light such as excimer laser in atmosphere of ozone.

Thereafter, an alignment film (not shown) is formed, by polyimide, for example, and rubbing treatment is applied to the surface of the alignment film. In this case, since the film thickness of the inter-layer insulating film 6 is made 3 μm which is thicker than a conventional film thickness, the surface of the inter-layer insulating film 6 becomes flatter, thereby solving conventional problems, such as disorderly alignment of the liquid crystal.

Moreover, when the inter-layer insulating film 6 is formed as thick as several micron meters, the light from the backlight is incident upon the pixel section in an oblique direction (oblique incidence). Therefore, if this liquid crystal display device is used for direct viewing, an apparent aperture ratio which contributes to the display becomes higher than an actual aperture ratio, thereby improving contrast. Further, by effectively utilizing the oblique incidence, the viewing angle becomes wider. It is thus known that an improved result is obtained by overlapping the pixel electrode 4 and either or both of the gate and source lines 1 and 2 to some extent.

Here, since the inter-layer insulating film 6 is formed as thick as several micron meters, it is preferred to use a material having a transmittance as high as possible, i.e., transmittance not lower than 90%, for the inter-layer insulating film 6. In this case, when using a slightly colored material, it is preferred to choose a material that has high spectral transmittance for green and red and a slightly lower spectral transmittances for blue because the sensitivity of the human eye is slightly lower for wavelengths of blue (400 nm to 500 nm) than for wavelengths of green and red.

Finally, by placing the liquid crystal 8 between the active matrix substrate 13 and the counter substrate 11 having the black matrix 12, the common electrode and color filter (not shown), a liquid crystal display element of this embodiment is completed.

The liquid crystal display element thus fabricated has not only an improved aperture ratio but also prevents disclination because the pixel electrode 4 and the gate line 1 and source line 2 do not overlap in the same layer. Moreover, since the surface of the active matrix substrate 13 (the surface of the inter-layer insulating film 6 or the surface of the pixel electrode 4 in contact with the liquid crystal 8) is flattened, the alignment of the liquid crystal 8 is not disordered. Additionally, since the pixel electrode 4 and the self gate line do not overlap at all and since the parasitic capacitance ($C_{sp}$) produced at the overlapped section of the source line 2 and the pixel electrode 4 is small, the display quality (contrast, viewing angle, etc.) of the liquid crystal display device is significantly improved.

More specifically, the liquid crystal display device of this embodiment has a contrast ratio of 300:1 which is three times better than a conventional contrast ratio. Regarding the viewing angle, by decreasing the product ($\Delta n \times d$) of the refractive index anisotropy of the liquid crystal and the cell thickness, the characteristics of the viewing angle can be improved to such an extent that the displayed contents are recognized even when the liquid crystal display device is seen from a position just beside the display device. Thus, the liquid crystal display device of this embodiment is capable of achieving a real full-color display of 16.7 million colors (256 tones) which cannot be fulfilled by a conventional liquid crystal display device.

Furthermore, in the fabrication process of this embodiment, since the time during which the source line is exposed on the substrate surface is reduced compared to a conventional fabrication process, the probability of disconnection of lines due to dust or the like is significantly decreased. As a result, the non-defective product ratio is extremely increased. In addition, since the source line can be made thinner, the aperture ratio can further be improved.

Moreover, since the gate line 1 is covered with the gate insulating film 7, the inter-layer insulating film 6 and the pixel electrode 4, a direct current component is not applied to the liquid crystal 8, thereby preventing deterioration of the liquid crystal. Consequently, the reliability and the life of the liquid crystal display device are significantly improved.

Figure 5A:
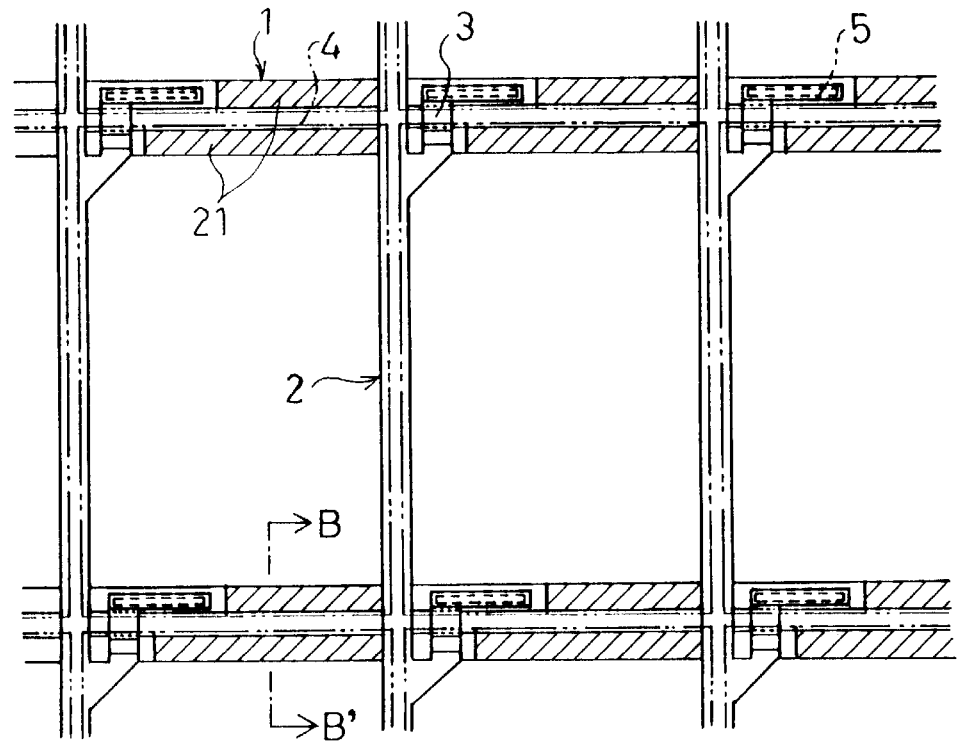
FIG. 5(*a*) is a plan view showing the structure of an active matrix substrate of a liquid crystal display element used in a liquid crystal display device according to Embodiment 3 of the present invention, and FIG. 5(*b*) is a sectional view showing a cross section of the liquid crystal display element cut along the B–B' plane in FIG. 5(*a*).

It is preferred to locate the contact hole 5 on the line as illustrated in FIG. 1(a) because of the reason as follows. Since the region where the contact hole is formed is not flat, the alignment of the liquid crystal is disordered in the region, causing an unfavorable display result. It is preferred to form the contact hole 5 in a large size as shown in FIG. 5(a) because the large contact hole achieves easy contact and a lower contact resistance.

The liquid crystal display device of this embodiment was operated, for example, in a 10.4-inch diagonal plane in VGA mode, and the line width of the gate line 1 and the source line 2 was arranged to be 10 μm, respectively. In this case, the aperture ratio was 67 percent. By contrast, the aperture ratio of a conventional liquid crystal display device which was fabricated under the same conditions was 60 percent. Thus, the aperture ratio of the liquid crystal display device of this embodiment is increased by 7 percent (or increased to 112 percent of the conventional aperture ratio). It is therefore possible to achieve a liquid crystal display device having the same brightness as that of a conventional liquid crystal display device with a reduced power consumption. Moreover, if a backlight whose power consumption is the same as that of the conventional liquid crystal display device is used, a brighter liquid crystal display device can be achieved.

The difference in the aperture ratio is produced because at least 4 μm space is required between the gate line and the source line in the conventional structure. In the structure of this embodiment, the space between the gate line 1 and the source line 2 in a direction horizontal to the substrate surface is made zero. It is more preferred to slightly overlap the gate line 1 and the source line 2 so as to eliminate the necessity of increasing precision in the fabrication process.

As to a method for driving the liquid crystal display device of this embodiment, it is preferred to use a 1H inversion driving method. The 1H inversion driving method is also called the 1 gate line inversion driving method. This driving method reverses the polarity of a data signal to be applied to the source line every horizontal (1H) period. In this method, even if the parasitic capacitance between the source line and pixel electrode is the same, the influence of an effective voltage applied to the liquid crystal is reduced to one fifth to one tenth compared to a field inversion driving method. Thus, this driving method can prevent deterioration of the liquid crystal, and improve the life and reliability of the liquid crystal display device.

The reason for such an improvement is that, when the 1H inversion driving method is used, since the polarity of the data signal is inverted in a relatively short cycle with respect to one field time, the influence of a signal with a positive polarity and a signal with a negative polarity on the display is cancelled.

As a method for driving the liquid crystal display device of this embodiment, it is possible to use a source line inversion driving method which inverts the polarity of a data signal to be applied to the source line every source line, or a dot inversion driving method which inverts the polarity of the data signal every second adjacent pixel, instead of the 1H inversion driving method.

In the source line inversion driving method, since signals of opposite polarities are input to adjacent source lines, respectively, the parasitic capacitance produced at the overlapped section of the source line and the pixel electrode is cancelled out by the adjacent source lines. Therefore, even if the parasitic capacitance is the same, the influence of the effective voltage on the liquid crystal can be reduced compared the field inversion driving method.

In the dot inversion driving method, signals of opposite polarities are input to adjacent source lines, respectively, and the inversion of the polarity of signal is performed every 1H period. Therefore, even if the parasitic capacitance is the same, the influence of the effective voltage on the liquid crystal can be reduced compared to the field inversion driving method. This dot inversion driving method is a combination of the 1H inversion driving method and the source line inversion driving method, and is the most effective method when considering a reduction in the influence of the effective voltage on the liquid crystal.

The effect of the 1H inversion driving method, the source line inversion driving method, or the dot inversion driving method is particularly prominent on an OA-use liquid crystal display panel using a pixel electrode whose longer side lies in a vertical direction.

In addition, when a resin is used as a material for the inter-layer insulating film 6, the resin may be dyed to cause the inter-layer insulating film 6 to function as a color filter or a light blocking film.

In this embodiment, a photosensitive acrylic resin is used as a material for the inter-layer insulating film 6. However, it is not necessary to limit the material for the inter-layer insulating film 6 to the photosensitive acrylic resin. Alternative preferred materials are acrylic resins having no photosensitive properties, for example, JSS-924 (trade name) as two-component system acrylic resin and JSS-925 (trade name) as one-component system acrylic resin produced by Japan Synthetic Rubber Co., Ltd., and materials having low relative permittivity and high transparency, more specifically, a transmittance of not lower than 90 percent in a visible light region. Examples include polyamide imide (whose relative permittivity is between 3.5 and 4), polyarylate (whose relative permittivity is 3.0), polyether imide (whose relative permittivity is 3.2), epoxy (whose relative permittivity is between 3.5 and 4), and highly transparent polyimide (whose relative permittivity is between 3 and 3.4). The highly transparent polyimide can be achieved by, for example, a compound of diamine and the dianhydride of an acid containing hexafluoropropylene.

Furthermore, in a transmissive liquid crystal display device using ITO as the pixel electrode 4, it is preferred to use a material having heat resistance at 200° C. or higher temperatures as the inter-layer insulating film 6. If the formation of the ITO film is carried out at 200° C. or higher temperatures, a film having excellent resistivity and transmittance is obtained, and the power consumption is reduced. Additionally, patterning can be performed in an improved manner, thereby achieving a highly precise pattern. In this case, the most preferred temperature is around 230° C. to 250° C., and the resistivity is decreased by more than 50 percent compared to a film formed at 150° C.

In the liquid crystal display device of this embodiment, as illustrated in FIGS. 1(*a*) and 1(*b*), the substantially entire gate line 1 is located below the pixel electrode 4. This arrangement is advantageous because a direct current component is not applied to the liquid crystal 8. It is thus possible to prevent deterioration of the liquid crystal, and improve the reliability and life of the liquid crystal display device.

[Embodiment 2]

Figure 3:
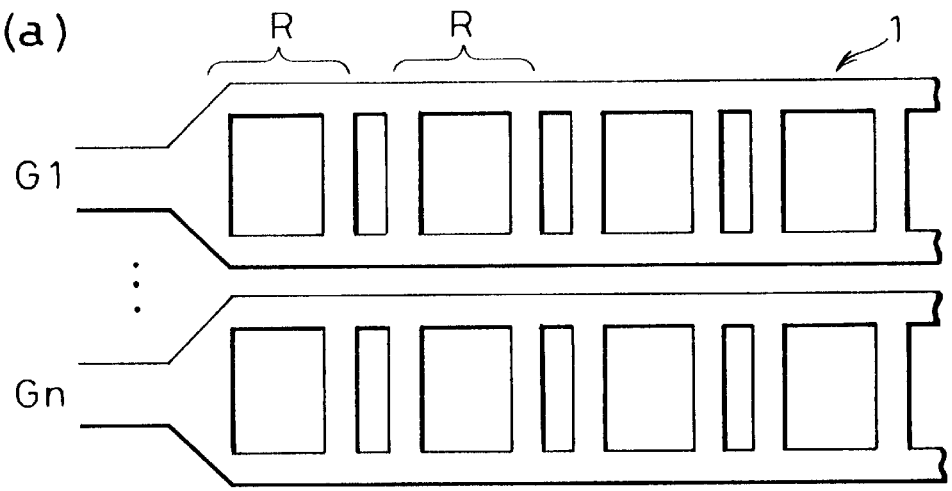
FIGS. 3(*a*) to 3(*c*) are plan views showing examples of the pattern of gate lines arranged on the active matrix substrate.
Figure 3:
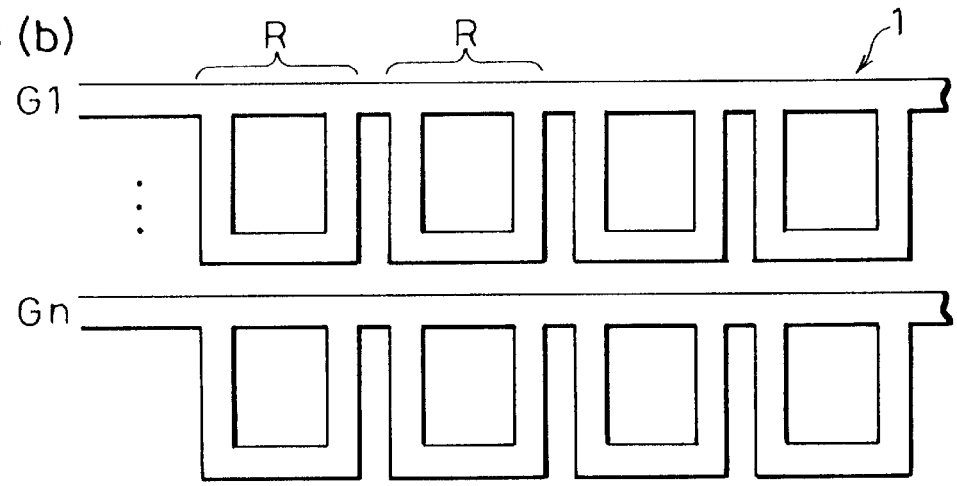
Figure 3:
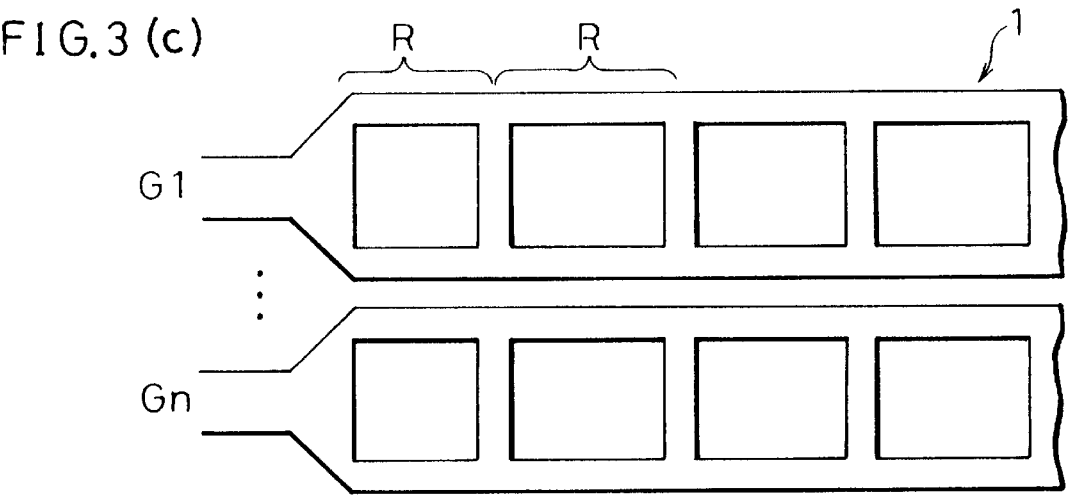
Figure 4A:
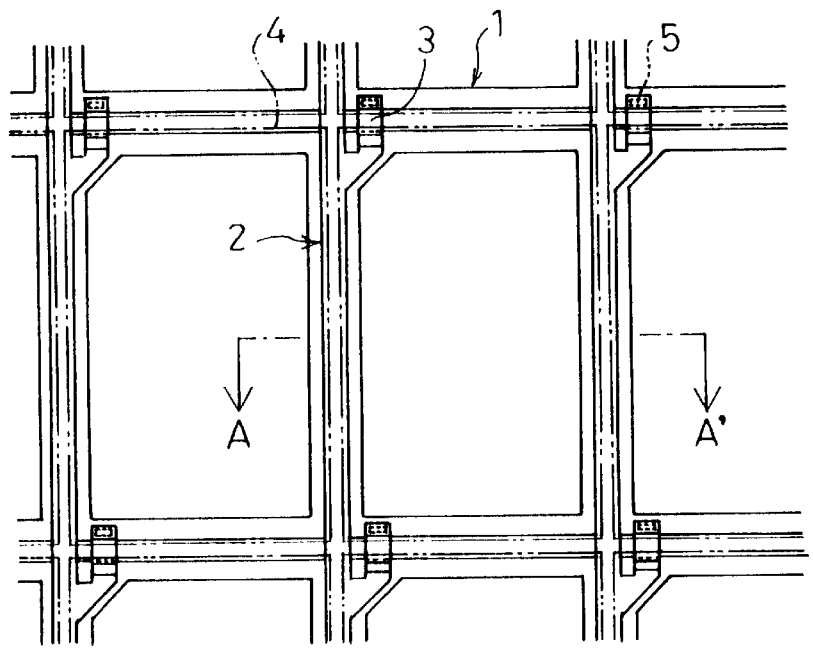
FIG. 4(*a*) is a plan view showing the structure of an active matrix substrate of a liquid crystal display element used in a liquid crystal display device according to Embodiment 2 of the present invention, and FIG. 4(*b*) is a sectional view showing a cross section of the liquid crystal display element cut along the A–A' plane in FIG. 4(*a*).
Figure 4B:
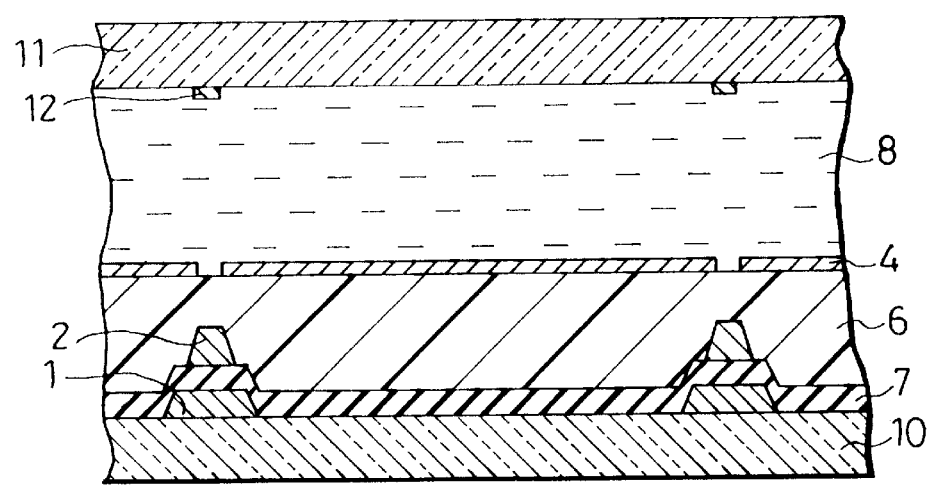

The following description will discuss Embodiment 2 of the present invention with reference to FIGS. 3(*a*) to 3(*c*), and FIG. 4(*a*) and 4(*b*). The structure having the same function as in the above-mentioned embodiment will be designated by the same code and their description will be omitted. The same can be said to other embodiments to be described later.

FIG. 4(*a*) is a plan view showing the structure of an active matrix substrate of a liquid crystal display element used in a liquid crystal display device according to Embodiment 2 of the present invention, and FIG. 4(*b*) is a sectional view showing a cross section of the liquid crystal display element cut along the A–A' plane in FIG. 4(*a*).

As illustrated in FIGS. 4(*a*) and 4(*b*), the differences between the active matrix substrate of this embodiment and the active matrix substrate of Embodiment 1 are as follows.

(1) As shown in FIG. 3(*c*), the gate line 1 is formed so that adjacent ring sections R have a common portion parallel to the source line 2.

(2) The common portion of adjacent ring sections R lies under the source line 2.

In the liquid crystal display device of this embodiment, as shown in FIG. 4(*b*), since an increase in thickness at the intersection of the gate line 1 and the source line 2 is significantly reduced, the possibility that the source line 2 is disconnected is decreased. Consequently, not only the non-defective product ratio is increased, but also the line width of the source line 2 is decreased, thereby significantly improving the aperture ratio of the liquid crystal display device.

Moreover, since the process margin in forming a line pattern is eliminated, the aperture ratio is improved.

Furthermore, this structure allows the portion of the gate line 1, which lies parallel to the source line 2, to have a greater line width than a conventional line width, thereby reducing the incidence of disconnection of lines.

In the structure of this embodiment, it is preferred to make the film thickness of the gate insulating layer 7 thick because the thicker the gate insulating film 7, the smaller the parasitic capacitance is formed at the overlapped section of the gate line 1 and the source line 2. Additionally, the increased film thickness of the gate insulating film 7 achieves improved insulation between the gate line 1 and the semiconducting layer of the TFT 3. In this case, it is preferred to use $SiO_2$ for the gate insulating film 7 because of the reasons below.

(1) Since the relative permittivity of $SiO_2$ is as low as 4, it is possible to further decrease the parasitic capacitance formed at the overlapped section of the gate line 1 and the source line 2.

(2) Since $SiO_2$ is highly transparent, even if the gate insulating film 7 is made thick, the color purity does not decline.

In this embodiment, it is possible to reduce the line width of the black matrix 12 formed on the counter substrate 11. However, considering the margin and other elements in fastening the active matrix substrate 13 and the counter substrate 11, it is preferred to arrange the line width of the black matrix 12 to be around three quarter to one second of the line width of the gate line 1.

In the gate line 1 having the redundant structure of this embodiment, the line width of the portion lying parallel to the source line 2 was made 20 $\mu$m, and the line width of other portions was made 10 $\mu$m.

In this case, the aperture ratio of the liquid crystal display device was 75 percent. This value shows a 15 percent increase compared to the aperture ratio (60 percent) of a conventional liquid crystal display device (i.e., the aperture ratio is increased to 125 percent of the aperture ratio of the conventional liquid crystal display device). It is known from this value that the aperture ratio of the liquid crystal display device of this embodiment is significantly improved.

Further, in Embodiment 2, the pixel electrode 4 is formed in the shape of a rectangle so as to ease the formation of a line pattern. This structure allows a significant improvement of the off characteristics of the TFT 3. The detail of the structure will be described in Embodiment 8 below. As a result, a liquid crystal display device with high display quality on which no dimmed images are seen is realized (i.e., a phenomenon in which the display as a whole becomes cloudy is prevented).

[Embodiment 3]

The following description will discuss Embodiment 3 of the present invention with reference to FIGS. 5(*a*) and 5(*b*). FIG. 5(*a*) is a plan view showing the structure of an active matrix substrate of a liquid crystal display element used in a liquid crystal display device according to Embodiment 3 of the present invention, and FIG. 5(*b*) is a sectional view showing a cross section of the liquid crystal display element cut along the B–B' plane in FIG. 5(*a*).

As illustrated in FIGS. 5(*a*) and 5(*b*), in an active matrix substrate of a liquid crystal display device of Embodiment 3, a portion of the gate line 1 having the redundant structure, which lies parallel to the source line 2 is formed with a line width equal to or thinner than the source line 2 under the source line 2.

Moreover, a capacitor line 21 is formed by the same material as the source line 2 on a portion of the gate line 1 having the redundant structure, which crosses the source line 2 at a right angle and has no contact hole 5 nor TFT 3 formed thereon. In this liquid crystal display device, the storage capacitor ($C_s$) is formed by the capacitor line 21. In FIG. 5(a), the capacitor line 21 is shown by hatching so that the position where the capacitor line 21 is formed is easily recognized.

Figure 5B:
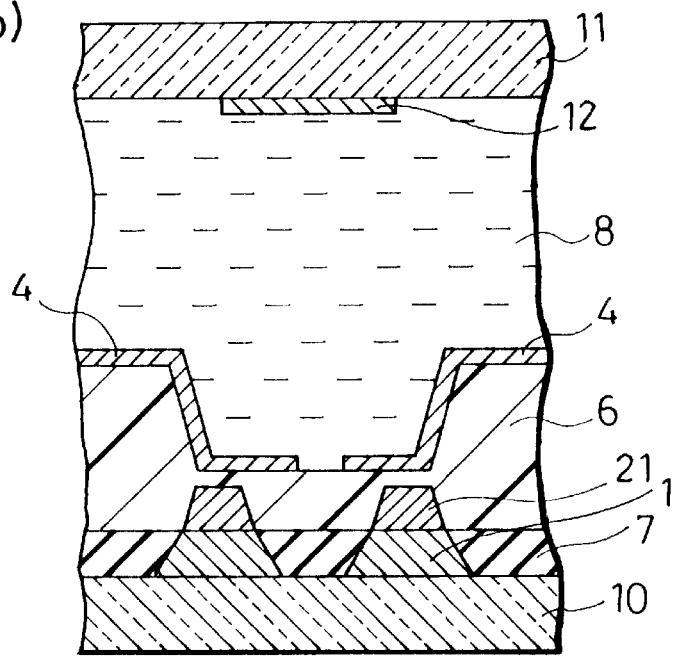

As illustrated in FIG. 5(b), the gate insulating film 7 is eliminated from the portion of the gate line 1 where the capacitor line 21 is formed. Further, a portion of the inter-layer insulating film 6 located on the capacitor line 21 has a smaller film thickness than other portions thereof. Thus, by reducing the space between the pixel electrode 4 and the gate line 1 at the portion where the capacitor line 21 is formed, it is possible to form a greater storage capacitor ($C_s$) between the pixel electrode 4 and the gate line 1.

Additionally, in the active matrix substrate of this liquid crystal display device, a light blocking film, for example, black matrix, is provided only in a longitudinal direction of the gate line 1 on the counter substrate 11. The liquid crystal display device of this embodiment differs from Embodiment 2 in the above-mentioned points, but other structures are the same as those of Embodiment 2.

Now, a method for fabricating the liquid crystal display device of this embodiment will be discussed. First, the gate line 1 is formed on the TFT substrate 10. Second, the gate insulating film 7 is formed to cover the gate line 1. Third, a semiconducting layer and n$^+$ layer (not shown) are formed on the gate insulating film 7. Thereafter, an opening is formed in a portion of the gate insulating film 7 where the capacitor line 21 will be formed later. Namely, the gate insulating film 7 is removed from a portion where the gate line 1 crosses the source line 2 at a right angle and the contact hole 5 and the TFT 3 are not formed. Thus, by simultaneously performing the treatment for forming the opening in the gate insulating film 7 and a treatment for removing the gate insulating film 7 from a terminal where an external driving circuit of the gate line 1 is mounted, the number of fabrication steps does not increase.

Next, the source line 2, a contact electrode (drain electrode) to the pixel electrode 4, and the capacitor line 21 are formed by, for example, Ta or Al. Thus, by simultaneously forming the source line 2 and the capacitor line 21 using the same material, the number of fabrication steps does not increase.

Subsequently, a power supply is connected to the gate line 1 while soaking the substrate in an electrolyte, and anodic oxidation is performed. At this time, it is preferred to protect the semiconducting layer with a rubber resist or the like. Thereafter, the inter-layer insulating film 6, the pixel electrode 4, and an alignment film, not shown, are formed in this order, and the active matrix substrate 13 and the counter substrate 11 having the black matrix 12 thereon are fastened. Then, the liquid crystal 8 is introduced between the substrates 11 and 13 to complete the liquid crystal display element.

In the liquid crystal display element of this embodiment, as described above, since the capacitor line 21 is formed on the gate line 1 by the same material as the source line 2, the storage capacitor ($C_s$) is increased. Moreover, the step of forming only the capacitor line 21 is unnecessary, and therefore the total number of fabrication steps does not increase.

It is preferred to form a metal oxide film on the surface of the capacitor line 21 by anodic oxidation or other oxidation because the metal oxide film formed by anodic oxidation or other oxidation generally has high relative permittivity. For example, the relative permittivity of the tantalum oxide is 25, and that of titanium oxide is 90. Thus, a further increased storage capacitor ($C_s$) can be easily obtained. As a result, the line width can be further reduced, and therefore the aperture ratio can be improved. When the capacitor line 21 undergoes anodic oxidation, there is no need to place the inter-layer insulating layer 6 between the capacitor line 21 and the pixel electrode 4. However, it is preferred to slightly use the inter-layer insulating film 6 between the capacitor line 21 and the pixel electrode 4 to reduce the possibility of leakage.

The aperture ratio of the liquid crystal display device of this embodiment was 84 percent when the line width of the gate line 1 and the source line 2 was made 10 μm, respectively. The above-mentioned value shows a 24 percent increase compared to the aperture ratio (60 percent) of a conventional liquid crystal display device (i.e., the aperture ratio is increased to 140 percent of the aperture ratio of the conventional liquid crystal display device). Thus, the structure of this embodiment permits a liquid crystal display device having a significantly improved aperture ratio. In addition, since substantially the same design rules and fabrication processes as those used in fabricating a conventional liquid crystal display device can be used, it is known that the structure of Embodiment 3 is highly effective.

[Embodiment 4]

Figure 6:
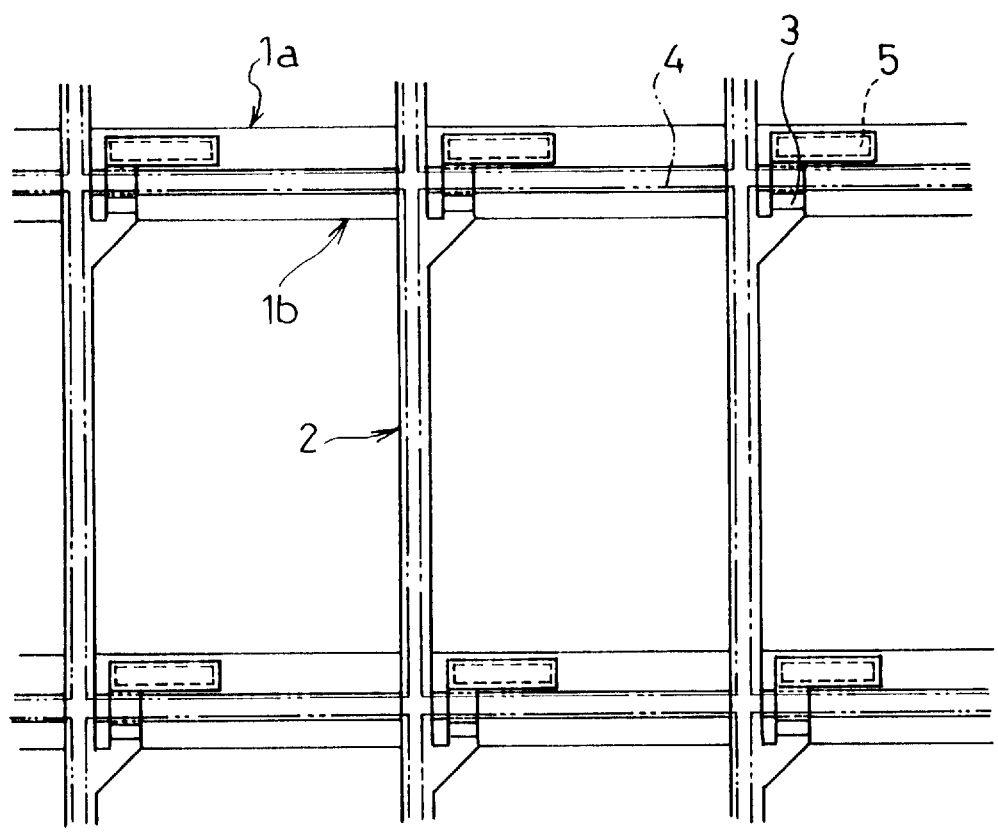
FIG. 6 is a plan view showing the structure of an active matrix substrate of a liquid crystal display element used in a liquid crystal display device according to Embodiment 4 of the present invention.

The following description will discuss Embodiment 4 of the present invention with reference to FIG. 6. FIG. 6 is a plan view showing the structure of an active matrix substrate of a liquid crystal display element used in a liquid crystal display device according to Embodiment 4 of the present invention.

As illustrated in FIG. 6, in the active matrix substrate of the liquid crystal display device of Embodiment 4, a portion of the gate line 1 having the redundant structure, which crosses the source line 2 at a right angle, has a greater line width so as to increase the area of the storage capacitor ($C_s$) Moreover, the line width of a gate line 1a on which the TFT 3 is not formed is made thicker than that of a gate line 1b on which the TFT 3 is formed. The line width of the gate line 1a is 20 μm, and the line width of the gate line 1b is a half of the gate line 1a, i.e., 10 μm. The source line 2 is formed by a single layer of an Al film with a thickness of 3000 Å. Other structures are the same as those of Embodiment 2.

The reasons for making the line width of the gate line 1a thicker than that of the gate line 1b are as follows. Since the contact hole 5 is formed on the gate line 1a, the thickness of the inter-layer insulating film 6 formed between the gate line 1a and the pixel electrode 4 is reduced, and therefore the storage capacitor ($C_s$) is effectively formed. Moreover, with this arrangement, not only the area of the contact section of the contact hole 5 is increased, but also a margin is produced.

The aperture ratio of the liquid crystal display device of this embodiment was 81 percent (i.e., the aperture ratio is 135 percent of the aperture ratio of a conventional liquid crystal display device). Thus, even though the line width is increased in this embodiment, the aperture ratio is improved compared to the conventional aperture ratio.

In the structure of this embodiment, like Embodiment 3 mentioned above, it is effective to form on the gate line 1 a thin film by the same material as the source line 2 so as to produce a storage capacitor. In this case, the characteristics of the TFT 3 can be improved by forming a thin gate line 1b and a thin semiconducting layer in the TFT 3.

[Embodiment 5]

The following description will discuss Embodiment 5 of the present invention with reference to FIGS. 7(a) and 7(b), and FIGS. 8(a) and 8(b).

Figure 7A:
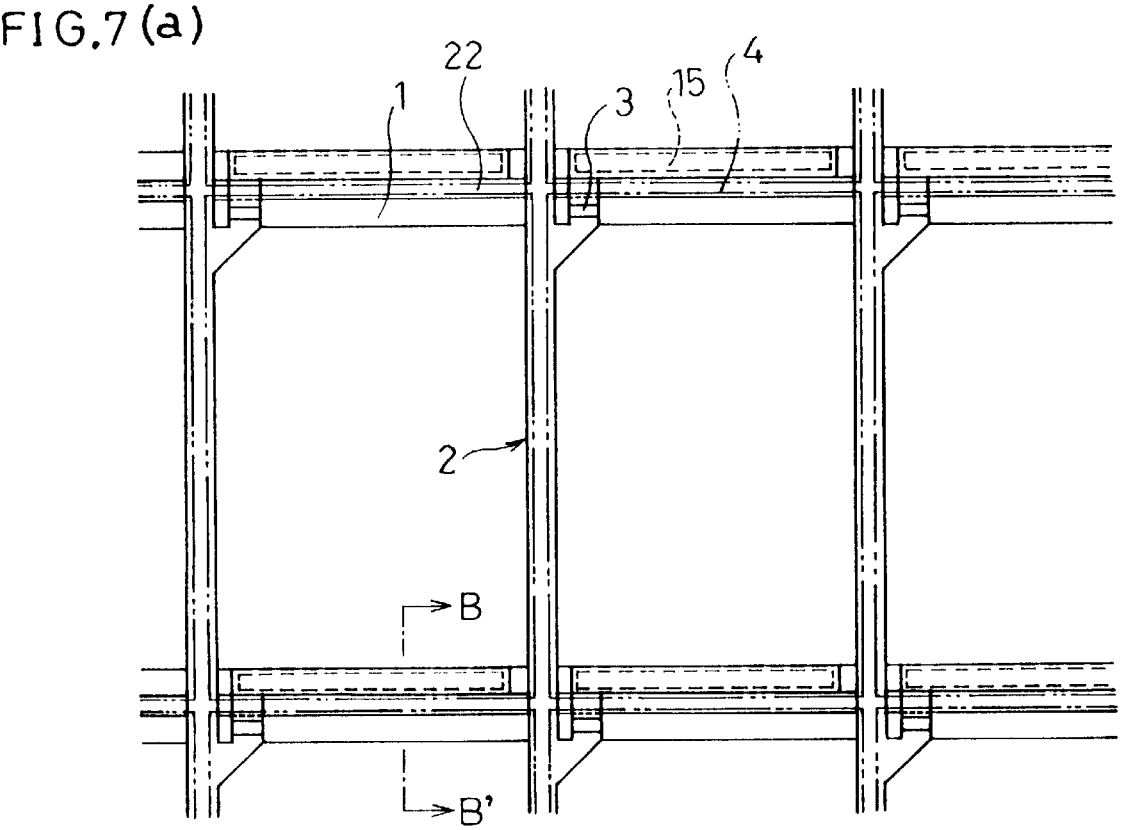
FIG. 7(*a*) is a plan view showing the structure of an active matrix substrate of a liquid crystal display element used in a liquid crystal display device according to Embodiment 5 of the present invention.
FIG. 7(b) is a sectional view showing a cross section of the liquid crystal display element cut along the B–B' plane in FIG. 7(a).
Figure 7B:
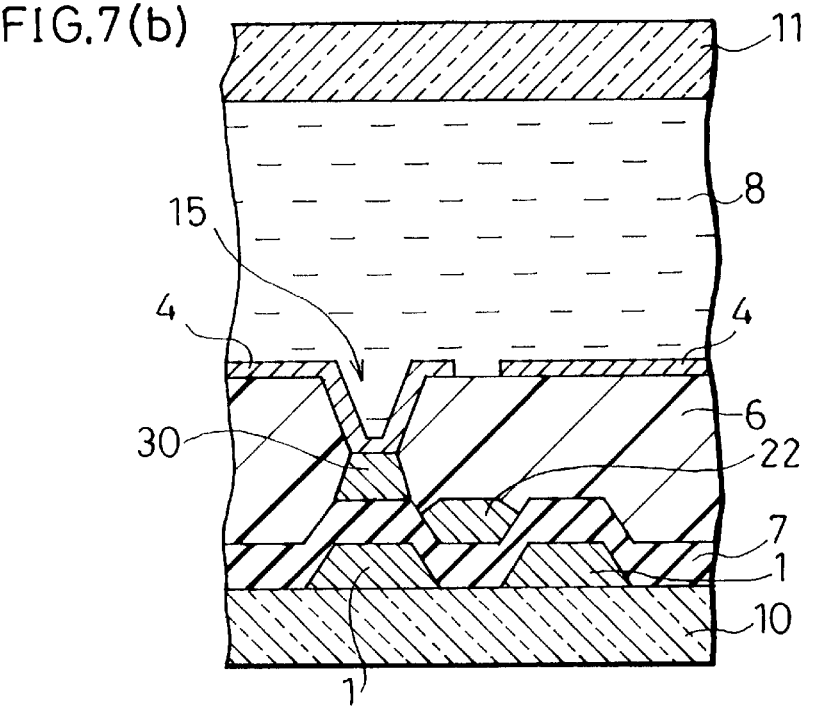

FIG. 7(a) is a plan view showing the structure of an active matrix substrate of a liquid crystal display element used in a liquid crystal display device according to Embodiment 5 of the present invention, and FIG. 7(b) is a sectional view showing a cross section of the liquid crystal display element cut along the B–B' plane in FIG. 7(a).

As illustrated in FIGS. 7(a) and 7(b), in the active matrix substrate of the liquid crystal display device of this embodiment, a drain electrode (contact electrode) 30 is formed on a substantially entire surface of one of portions, which cross the source line 2 at right angles, of a ring section of the gate line 1 having the redundant structure, on which one portion the TFT 3 is not formed, so that the gate insulating film 7 is sandwiched between the drain electrode 30 and the gate line 1. Moreover, a contact hole 15 is formed in the inter-layer insulating film 6 so that the substantially entire surface of the drain electrode 30 is exposed. The drain electrode 30 and the pixel electrode 4 are connected to each other through the contact hole 15. In this case, the storage capacitor ($C_s$) is formed by the gate insulating film 7 which is present in the overlapped section of the drain electrode 30 and the gate line 1.

In this embodiment, it is possible to use a metallic material having light blocking properties, such as Al and Ta, as the source line 2. A light blocking film 22 is formed by the same material and in the same process as the source line 2 along the gate line 1 on the gate insulating film 7 which is present between adjacent gate lines 1. The source line 2 also functions as a light blocking film in a direction orthogonal to the light blocking film 22. Namely, in the structure of this embodiment, it is not necessary to form a light blocking film, for example, black matrix, on the counter substrate 11.

As described above, in the liquid crystal display device of this embodiment, the storage capacitor is formed by the gate insulating film 7. The gate insulating film 7 is much thinner than the inter-layer insulating film 6, and is made of a material having high relative permittivity, such as $SiN_x$ and $SiO_x$. Such a structure achieves a great storage capacitor. Moreover, since the space between adjacent gate lines 1 is arranged to block light using the light blocking film 22 formed by the same material and the same process as the source line 2, it is possible to shorten the process and reduce the cost. It is also possible to arrange the light blocking film 22 to overlap the adjacent gate lines 1.

Figure 8A:
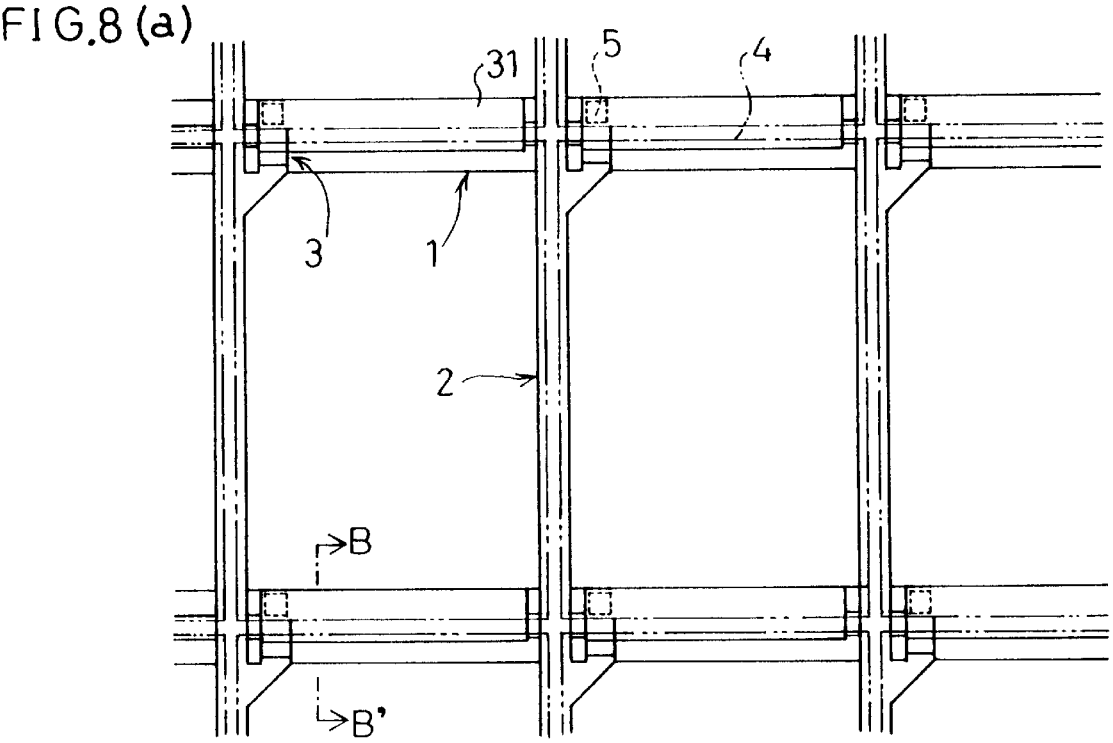
FIG. 8(a) shows a modified example of the liquid crystal display element of Embodiment 5, and is a plan view showing the structure of an active matrix substrate of the liquid crystal display element.
Figure 8B:
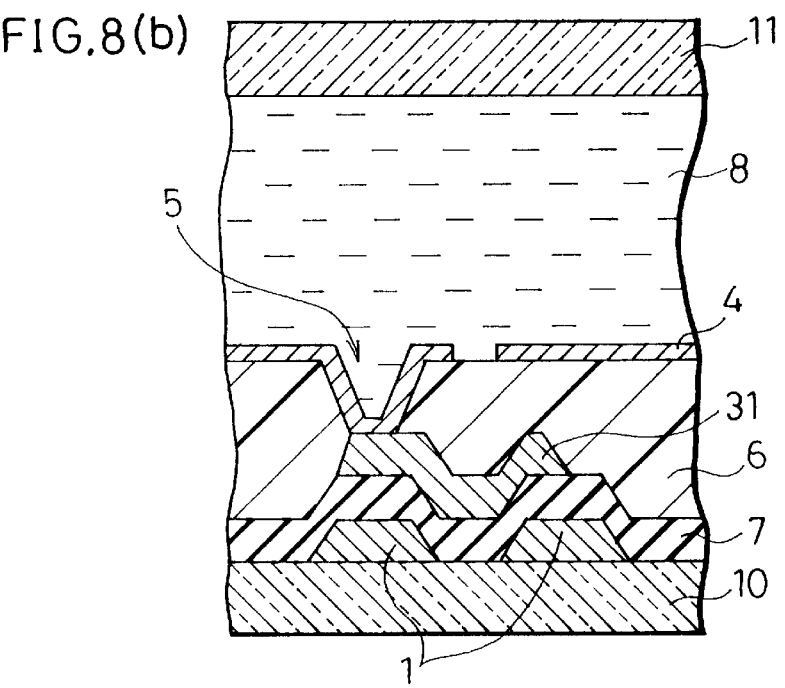
FIG. 8(b) is a sectional view showing a cross section of the liquid crystal display element cut along the B–B' plane in FIG. 8(a).

In the above description, the structure in which the light blocking film 22 is formed by the same material as the source line 2 is explained. However, it is also possible to arrange the space between adjacent lines 1 to block light using the drain electrode of the TFT 3 instead of the light blocking film 22. More specifically, as illustrated in FIGS. 8(a) and 8(b), the drain electrode (contact electrode) 31 of the TFT 3 is extended to a position where the drain electrode 31 overlaps the self gate line to cover the space between adjacent gate lines 1.

In this case, the parasitic capacitance ($C_{gd}$) is produced between the self gate line and the drain electrode 31. The parasitic capacitance ($C_{gd}$) is the parasitic capacitance ($C_{gp}$) between the self gate line and the pixel electrode 4. However, by minimizing the overlapped section of the self gate line and the drain electrode 31, the influence of the parasitic capacitance is minimized. Further, in the above-mentioned structure, the storage capacitor ($C_s$) is formed by a section where the drain electrode 31 and the gate line 1 adjacent to the self gate line overlap.

[Embodiment 6 ]

Figure 9A:
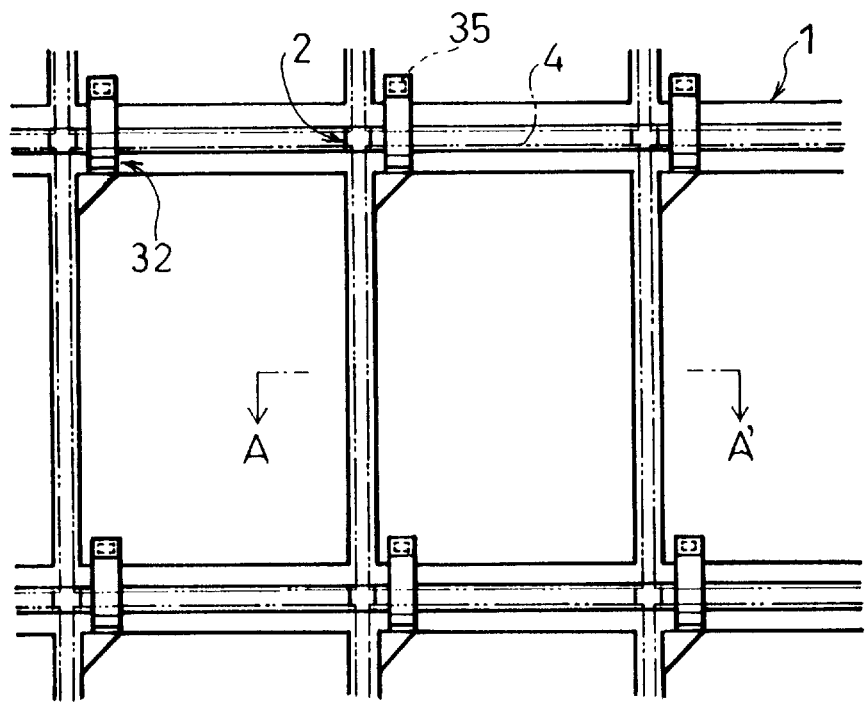
FIG. 9(a) is a plan view showing the structure of an active matrix substrate of a liquid crystal display element used in a liquid crystal display device according to Embodiment 6 of the present invention.
Figure 9B:
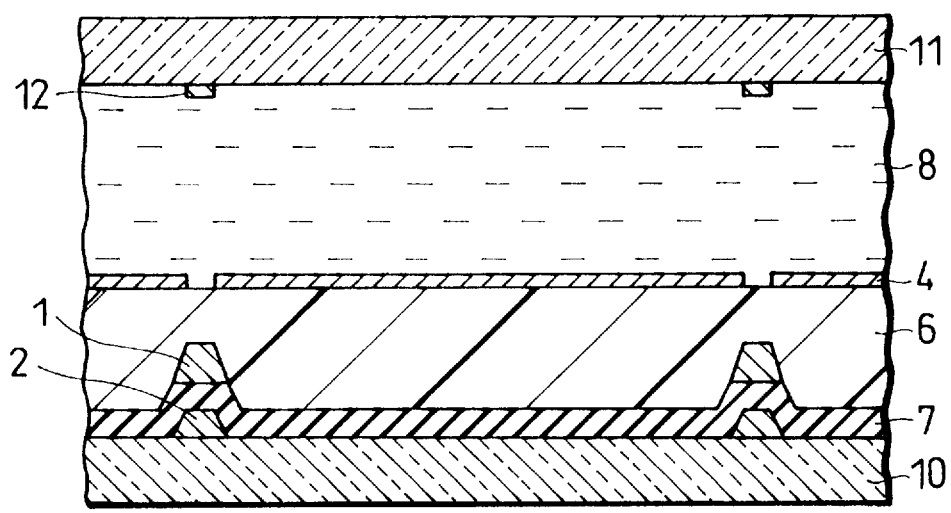
FIG. 9(b) is a sectional view showing a cross section of the liquid crystal display element cut along the A–A' plane in FIG. 9(a).

The following description will discuss Embodiment 6 of the present invention with reference to FIGS. 9(a) and 9(b).

FIG. 9(a) is a plan view showing the structure of an active matrix substrate of a liquid crystal display element used in a liquid crystal display device according to Embodiment 6 of the present invention, and FIG. 9(b) is a sectional view showing a cross section of the liquid crystal display element cut along the A–A' plane in FIG. 9(a).

As illustrated in FIGS. 9(a) and 9(b), in the active matrix substrate of this embodiment, a TFT 32 as a switching element has a top gate line structure (for example, stagger structure) rather than a bottom gate line structure (for example, inverted stagger structure) mentioned in Embodiments 1 to 5.

In the structure of this embodiment, first, the source line 2 and a drain electrode are formed. Second, a semiconducting layer and the gate insulating film 7 are formed. Thereafter, the gate line 1 is formed. Next, the inter-layer insulating film 6 is formed on the gate insulating film 7 and the gate line 1. Subsequently, a contact hole 35 is formed, and then the pixel electrode 4 is formed. Other structures are the same as those of Embodiment 1.

In the structure of this embodiment, it is preferred to make the contact hole 35 as small as possible for the reason below. Since the gate line 1 is formed on the source line 2, it is difficult to form a contact hole on a line which does not affect the display. Therefore, there is no choice but to form the contact hole 35 within the display area.

Moreover, in the structure of this embodiment, since the source line 2 does not overlap the pixel electrode 4 at all, the parasitic capacitance ($C_{sp}$) is not present at all between the source line 2 and the pixel electrode 4. Furthermore, since the distance between the gate line 1 and the pixel electrode 4 is small, the storage capacitor ($C_s$) formed between the gate line 1 and the pixel electrode 4 is great. It is thus possible to reduce the line width of the respective lines and improve the aperture ratio.

Additionally, it is possible to flatten the surface of the contact hole 35 formed in the display area by burying a flattening layer (not shown) in the contact hole 35. As a result, the alignment of the liquid crystal 8 is not disordered, and the display quality of the liquid crystal display device is further improved.

[Embodiment 7 ]

Figure 10A:
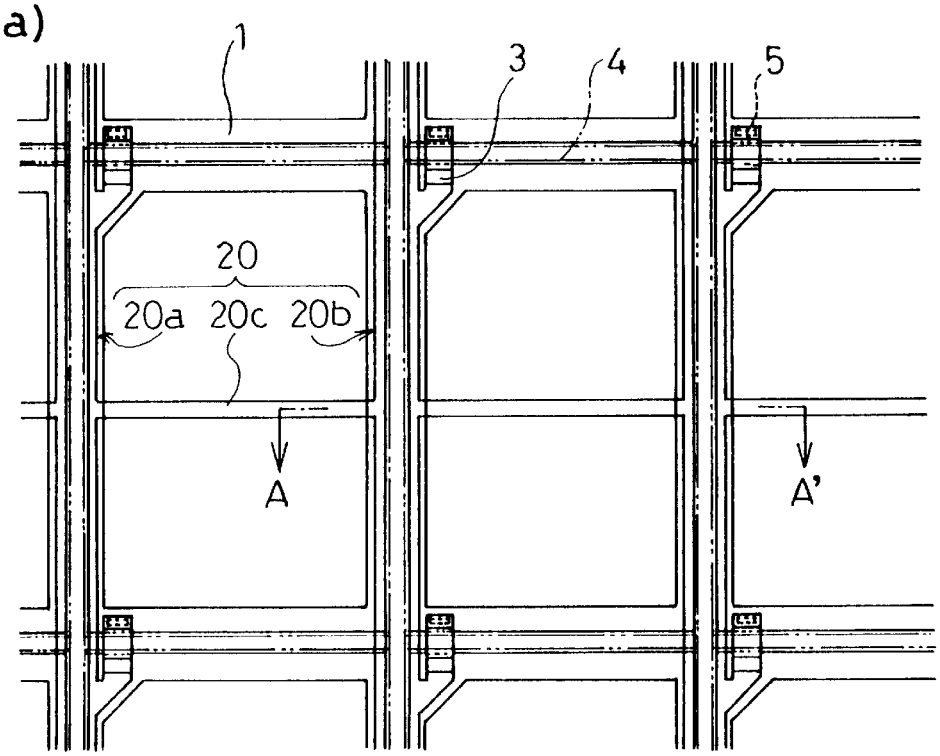
FIG. 10(a) is a plan view showing the structure of an active matrix substrate of a liquid crystal display element used in a liquid crystal display device according to Embodiment 7 of the present invention.
Figure 10B:
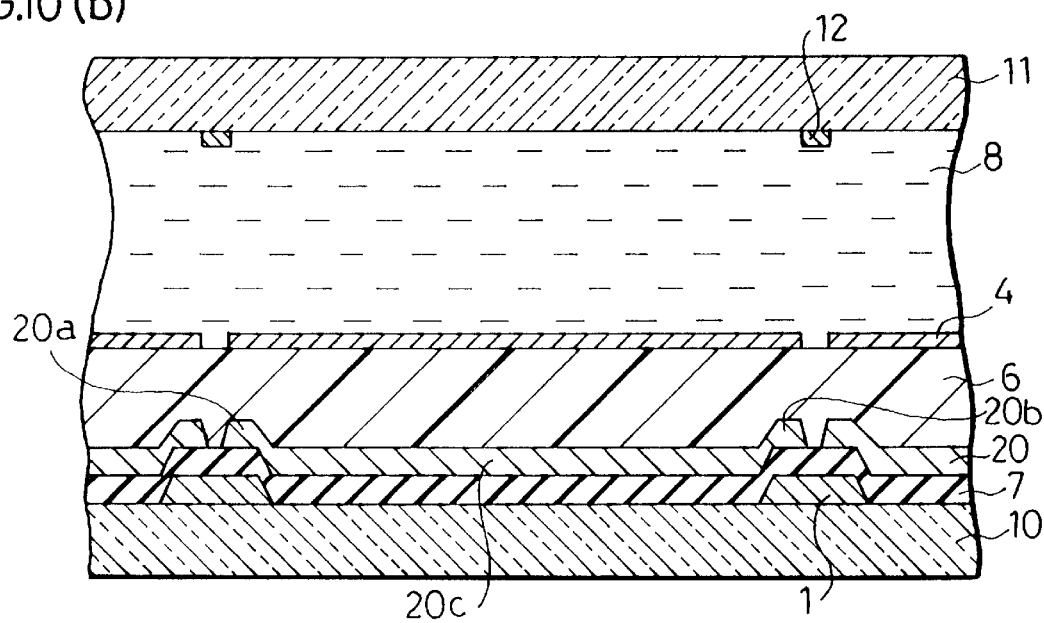
FIG. 10(b) is a sectional view showing a cross section of the liquid crystal display element cut along the A–A' plane in FIG. 10(a).

The following description will discuss Embodiment 7 of the present invention with reference to FIGS. 10(a) and 10(b).

FIG. 10(a) is a plan view showing the structure of an active matrix substrate of a liquid crystal display element used in a liquid crystal display device according to Embodiment 7 of the present invention, and FIG. 10(b) is a sectional view showing a cross section of the liquid crystal display element cut along the A–A' plane in FIG. 10(a).

As illustrated in FIGS. 10(a) and 10(b), the active matrix substrate has a redundant structure in which the gate line 1 includes ring sections enclosing the display area in which the pixel electrode 4 is formed as a measure to counter the disconnection of lines. Moreover, a source line 20 is formed by two branch lines 20a and 20b arranged on both sides of each pixel electrode 4, and a connection line 20c which runs across the center of the pixel electrode 4 and connects the branch lines 20a and 20b. Namely, in this structure, not only the gate line 1, but also the source line 20 has a ladder-like redundant structure as a measure to counter the disconnection of lines.

The branch line 20a is connected to the TFT 3, and supplies a data signal to the TFT 3. On the other hand, the branch line 20b serves as an extra line.

In one prior art arrangement, in general, an extra line is arranged outside of the display area, and a connection defect is repaired by connecting the disconnected section to the extra line with the irradiation of a laser. However, in this method, the number of lines which can be repaired is limited by the number of extra lines. Providing a large number of extra lines is not preferred because this causes an increase in the non-display area. Moreover, the repairing process using irradiation of a laser is required.

By contrast, in the structure of this embodiment, both the gate line 1 and the source line 20 have the redundant structure including ring sections. Therefore, in the case of the source line 20, for example, a connection defect does not occur unless both the branch lines 20a and 20b are disconnected between the adjacent connection lines 20c. Thus, the repairing process, for example, the irradiation of a laser in a conventional structure, is not required.

In this embodiment, as illustrated in FIGS. 10(a) and 10(b), the source line 20 is formed by the two branch lines 20a and 20b arranged on both sides of each pixel electrode 4, and the connection line 20c which runs across the center of the pixel electrode 4 and connects the branch lines 20a and 20b. However, the structure of the source line 20 is not necessarily limited to the one mentioned above. For instance, the branch line 20b may be positioned to cross the center of the pixel electrode 4. Moreover, in this embodiment, the connection line 20c is formed for each pixel electrode 4. However, the structure of the connection line 20c is not necessary to this.

Further, if the source line 20 is made only by metal, the aperture ratio is lowered by an amount corresponding to the area of the connection line 20c which runs across the pixel electrode 4. However, (1) when the source line 20 is formed by a single layer of ITO, or (2) when the source line 20 is formed by two layers of metal and ITO, if the connection line 20c is made only by ITO, it is possible to prevent a lowering of the aperture ratio.

Figure 11:
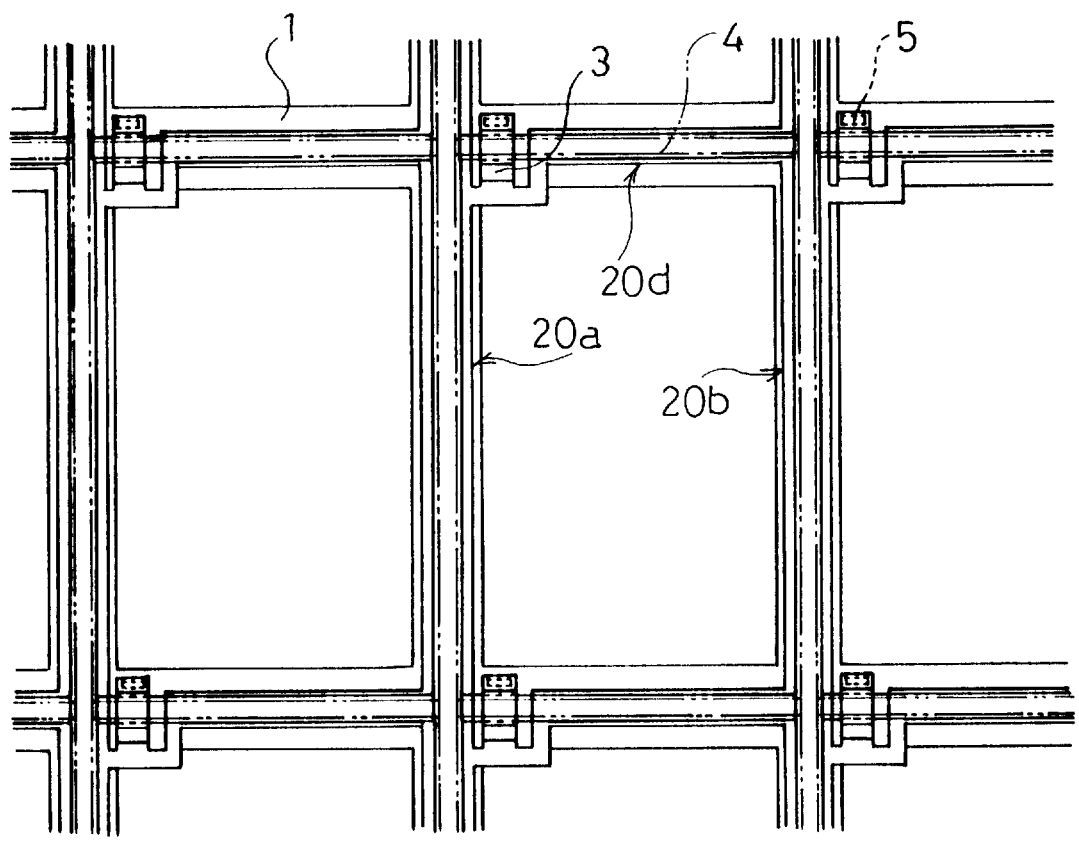
FIG. 11 is a plan view showing a modified example of the source line on the active matrix substrate of Embodiment 7.

FIG. 11 is a plan view showing a modified example of the source line 20 on the active matrix substrate of this embodiment. In this modified example, as illustrated in FIG. 11, the branch line 20a of the source line 20, which is branched to be connected to the TFT 3, is extended to form a connection line 20d for connecting the branch lines 20a and 20b, instead of the branch line 20c. In this case, it is preferred to form the connection line 20d so that the connection line 20d passes between adjacent gate lines 1 and partly overlaps both the gate lines 1. In this structure, a lowering of the aperture ratio does not occur, and the connection line 20d can also function as a light blocking film between adjacent gate lines 1.

As described above, in the liquid crystal display device of this embodiment, both the gate line 1 and the source line 20 have the redundant structure including the ring sections. Therefore, a connection defect does not occur at the source line 20 unless both the branch lines 20a and 20b are disconnected between the adjacent connection lines 20c and 20d, thereby achieving a significant improvement of the non-defective product ratio and a reduction in the cost.

[Embodiment 8]

Figure 12A:
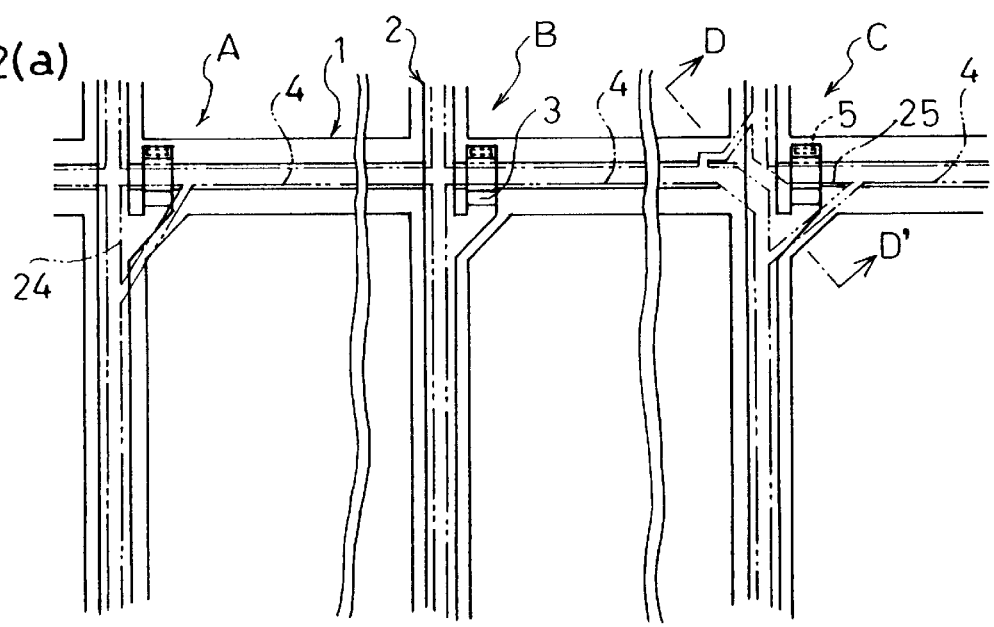
FIG. 12(a) is a plan view for explaining the structure in the vicinity of the intersection of a gate line and a source line on an active matrix substrate of a liquid crystal display element used in a liquid crystal display device according to Embodiment 8 of the present invention.
Figure 12B:
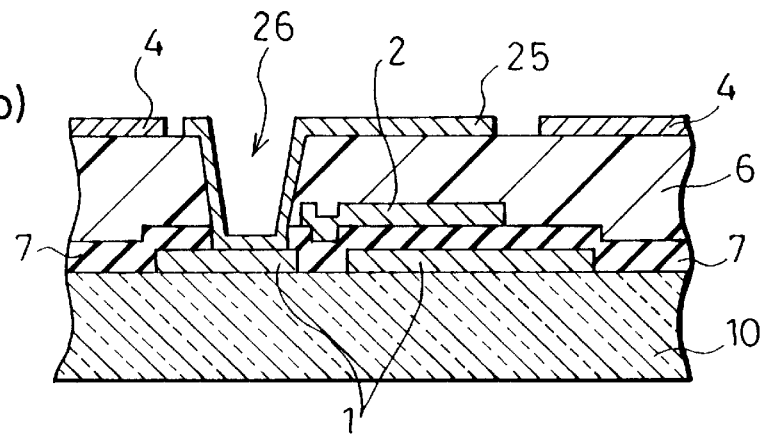
FIG. 12(b) is a sectional view showing a cross section of the liquid crystal display element cut along the D–D' plane in FIG. 12(a).
Figure 14A:
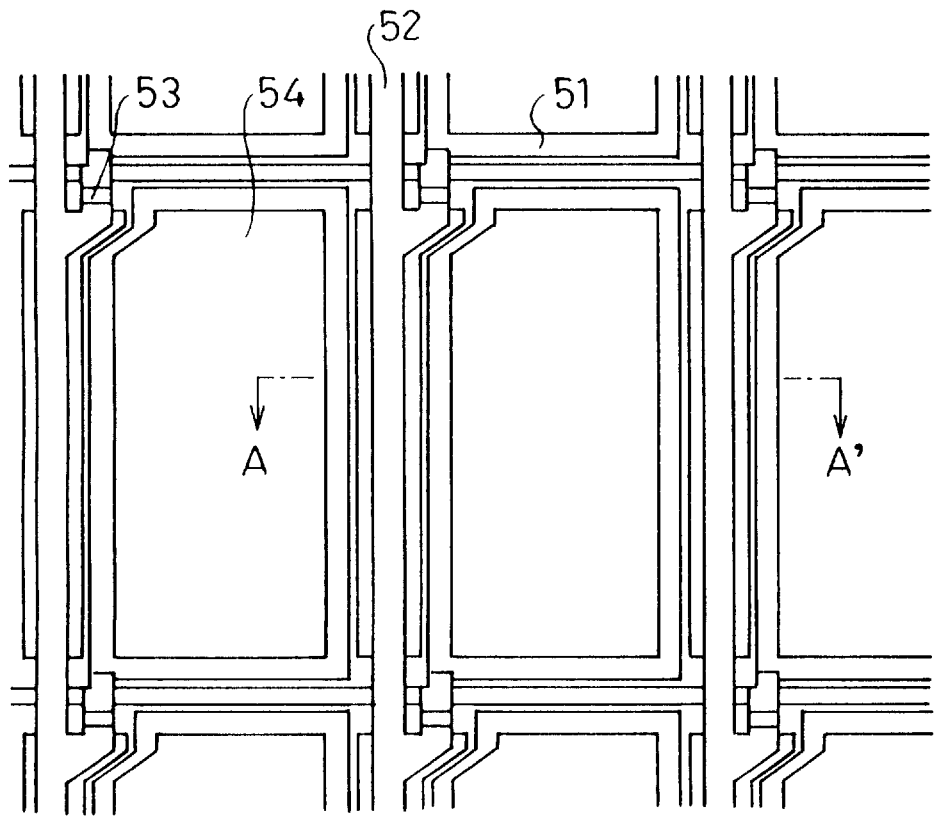
FIG. 14(a) is a plan view showing the structure of an active matrix substrate of a liquid crystal display element used in a conventional transmissive liquid crystal display device.
Figure 14B:
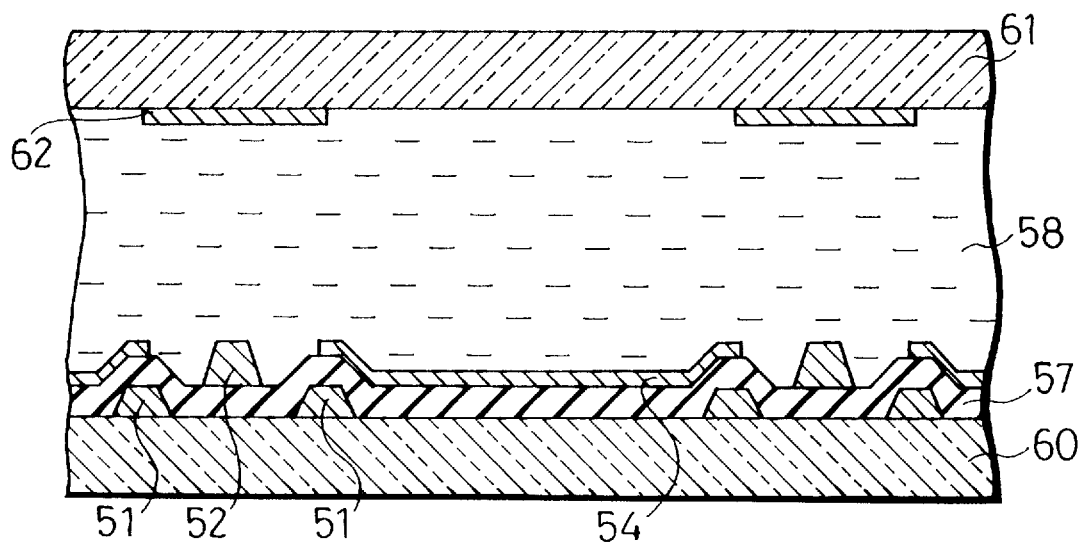
FIG. 14(b) is a sectional view showing a cross section of the liquid crystal display element cut along the A–A' plane in FIG. 14(a).
Figure 15:
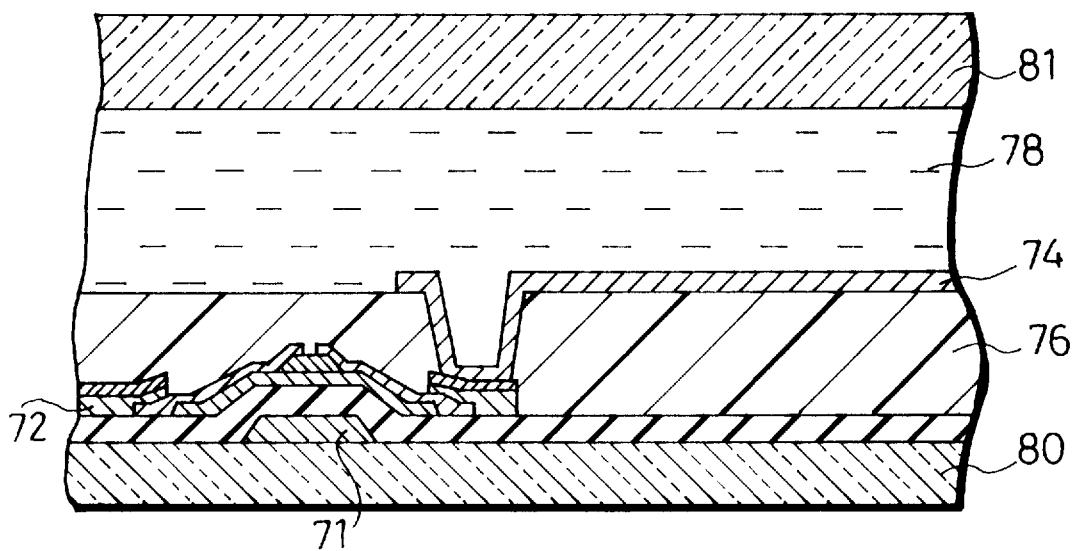
FIG. 15 is a sectional view showing the structure of a liquid crystal display element used in another conventional transmissive liquid crystal display device.

The following description will discuss Embodiment 8 of the present invention with reference to FIGS. 12(a) and 12(b).

In an active matrix substrate used in a liquid crystal display device of Embodiment 8, the vicinity of the intersection of the gate line 1 and the source line 2, i.e., the vicinity of the TFT 3 has a structure for preventing polarization of the gate insulting film 7 and the inter-layer insulating film 6, and deterioration of the off characteristics of the TFT 3 as a switching element. This structure is particularly effective when an organic resin material, for example, acrylic material, is used as the inter-layer insulating film 6.

Referring now to FIGS. 12(a) and 12(b), the following description will explain the detailed structure in the vicinity of the intersection of the gate line 1 and the source line 2. The structure indicated as an intersection "A" in FIG. 12(a) is a structure in which an auxiliary electrode 24 made of the same material as the pixel electrode 4 is arranged in an island form on the inter-layer insulating film 6 so as to cover the top of the TFT 3.

The structure indicated as an intersection "B" in FIG. 12(a) is a structure in which the pixel electrode 4 formed on the inter-layer insulating film 6 is extended to cover the top of the TFT 3. In this structure, since each of the pixel electrodes 4 is formed in the shape of a rectangle, a desired pattern can be easily formed. Thus, this structure is particularly preferred.

The structure indicated as an intersection "C" in FIG. 12(a) is a structure in which an auxiliary electrode 25 made of the same material as the pixel electrode 4 is formed to cover the top of the TFT 3 with the inter-layer insulating film 6 therebetween. As illustrated in FIG. 12(b), the auxiliary electrode 25 is connected to adjacent gate line 1 through a contact hole 26 formed in the inter-layer insulating film 6. FIG. 12(b) is a sectional view showing a cross section of the intersection C cut along the D–D' plane in FIG. 12(a).

All of the structures of the intersections A, B and C were extremely effective to prevent deterioration of the off characteristics of the TFT 3 in aging tests carried out at a high temperature (60° C.). In a liquid crystal display device adopting any of these structures, the amount of shift observed in the off characteristics of the TFT 3 was very small. Thus, the resultant liquid crystal display device produces an extremely clear display without cloudiness.

[Embodiment 9]

The following description will discuss Embodiment 9 of the present invention with reference to mainly FIGS. 13(a) and 13(b).

As illustrated in FIG. 13(a), an active matrix substrate used in a liquid crystal display device of this embodiment includes the gate line 1 having the ladder-like structure shown in FIG. 3(c). A portion of the gate line 1, which is parallel to the source line 2, is formed to have a line width not thicker than the source line 2 so that it is completely covered with the source line 2.

This active matrix substrate includes rectangular pixel electrodes 4 arranged in a matrix form. Each of the pixel electrodes 4 is formed to overlap adjacent source lines 2. A characteristic of the active matrix substrate is that the pixel electrodes 4 are arranged to cover the space between adjacent gate lines 1 as shown in FIG. 13(b).

Referring now to FIG. 13(a), the following description will specifically explain the structure of the pixel electrodes 4 of the active matrix substrate by taking one pixel electrode 4a among a plurality of the pixel electrodes 4 as an example. For the sake of simplifying the explanation, a gate line (self gate line of the pixel electrode 4a) on which the TFT 3 for driving the pixel electrode 4a is formed is indicated as "g2", and a gate line located one stage above the gate line g2 is indicated as "g1" in FIG. 13(a).

The pixel electrode 4a overlaps a portion of the gate line g1 which crosses the source line 2 at a right angle and is not adjacent to the gate line g2, and also overlaps a portion of the gate line g2 which crosses the source line 2 at a right angle and is adjacent to the gate line g1. Namely, the pixel electrode 4a is extended to a position where the pixel electrode 4a overlaps the self gate line (gate line g2). Consequently, the space between the gate lines g1 and g2 is covered with the pixel electrode 4a.

Thus, in the liquid crystal display device of this embodiment, since the pixel electrode 4 is formed to cover the space between adjacent gate lines 1, this space is not seen when an image is displayed. As a result, a liquid crystal display device with high display quality is realized. Moreover, since the formation of the pixel electrode 4 can be easily carried out in the above-mentioned manner by forming the pixel electrode pattern, the processing steps do not become complicated in manufacture.

In this structure, since each of the pixel electrodes 4 overlaps the self gate line, a slight amount of parasitic capacitance ($C_{gp}$) is produced between the gate line 1 and the pixel electrode 4. However, by minimizing the overlapped section of the pixel electrode 4 and the self gate line, or by increasing the thickness of the inter-layer insulating film 6, the effect of the parasitic capacitance ($C_{gp}$) can be reduced.

Compared to the structures of the above-mentioned embodiments, in the structure of this embodiment, the pixel electrode 4 is extended in a direction toward the self gate line, i.e., both of adjacent pixel electrodes 4 in a longitudinal direction of the source line 2 overlap one of the portions, which cross the source line 2 at right angles, of the gate line 1, on which one portion the TFT 3 is formed. However, the present invention is not necessarily limited to this structure. Namely, it is possible to form both of adjacent pixel electrodes 4 in a longitudinal direction of the source line 2 to overlap one of the portions, which cross the source line 2 at right angles, of the gate line 1, on which one portion the TFT 3 is not formed. In this case, since the self gate line does not overlap the pixel electrode 4, no parasitic capacitance ($C_{gp}$) is produced, but one problem arises that the area of the contact hole 5 is reduced. However, this problem can be solved by forming the contact hole 5 to be wide so as to increase the area of the contact as described in Embodiment 5 (see FIG. 7(a)).

Furthermore, in order to increase the contrast ratio by further improving the light blocking effect between adjacent gate lines 1, it is effective to form a light blocking film between the adjacent gate lines 1 from the same material as the source line 2 as described in Embodiment 5, or by using, instead of the source line 2, the source line 20 having the connection line 20d which branches from the connection point of the TFT 3 and blocks light in the space between the gate lines 1 as described in Embodiment 7.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display element comprising:
   a switching element in a vicinity of an intersection of a scanning line and a signal line; and
   a pixel electrode connected to said switching element, said pixel electrode having an extended section for covering a space between adjacent scanning lines,
   wherein at least one of said scanning line and said signal line has ring-shaped redundant sections, and
   an inter-layer insulating film is provided between said pixel electrode and said scanning line, signal line and switching element.

2. The liquid crystal display element according to claim 1, wherein said inter-layer insulating film is made of an organic resin.

3. The liquid crystal display element according to claim 2, wherein said organic resin is an acrylic resin.

4. The liquid crystal display element according to claim 1, wherein said scanning line has a metal oxide film on a surface thereof.

5. The liquid crystal display element according to claim 1, wherein said pixel electrode is made of ITO, and
   said inter-layer insulating film is made of a material exhibiting heat resistance at 200° C. or higher temperatures.

6. The liquid crystal display element according to claim 1, wherein adjacent redundant sections are connected to each other with more than one connection line.

7. The liquid crystal display element according to claim 1, wherein adjacent redundant sections are connected to each other with one connection line.

8. The liquid crystal display element according to claim 1, wherein adjacent redundant sections have a common portion.

9. The liquid crystal display element according to claim 1, wherein said scanning line has ring-shaped redundant sections, and
   a portion of said redundant section, which is parallel to said signal line, has a line width equal to or smaller than a line width of said signal line.

10. The liquid crystal display element according to claim 1,
    wherein said scanning line has ring-shaped redundant sections,
    one of portions of said redundant section which portions cross said signal line at right angles is made thicker than the other portion, and
    said inter-layer insulating film located on said one portion has a contact hole through which said switching element and said pixel electrode are electrically connected.

11. The liquid crystal display element according to claim 1,
    wherein an insulating film for forming a storage capacitor is provided between said scanning line and a contact electrode of said switching element.

12. The liquid crystal display element according to claim 1, further comprising a light blocking film, made of the same material as said signal line, for blocking light between adjacent scanning lines.

13. The liquid crystal display element according to claim 1,
    wherein a contact electrode of said switching element has an extended section for covering a space between adjacent scanning lines.

14. The liquid crystal display element according to claim 1,
    wherein said scanning line has ring-shaped redundant sections, and
    a portion of said redundant section, which is parallel to said signal line, lies under said signal line.

15. The liquid crystal display element according to claim 14,
    wherein a gate insulating film made of $SiO_2$ is provided between said signal line and the portion of said redundant section, which is parallel to said signal line.

16. The liquid crystal display element according to claim 1,
    wherein said scanning line has ring-shaped redundant sections, and a capacitor line for forming a storage capacitor is provided on a portion of said redundant section, which crosses said signal line at a right angle.

17. The liquid crystal display element according to claim 16,
wherein said capacitor line is made of the same material as said signal line.

18. The liquid crystal display element according to claim 16,
wherein said capacitor line has on a surface thereof an oxide film formed by anodic oxidation.

19. The liquid crystal display element according to claim 1,
wherein one extra line is provided for each signal line to be parallel to said signal line, and said signal line and said extra line are connected to each other with a connection line.

20. The liquid crystal display element according to claim 19,
wherein said connection line is made of ITO.

21. The liquid crystal display element according to claim 19,
wherein said signal line and said extra line are arranged on both sides of said pixel electrode.

22. A liquid crystal display element, comprising:
a switching element in a vicinity of an intersection of a scanning line and a signal line, said scanning line having ring-shaped redundant sections; and
a pixel electrode connected to said switching element, said pixel electrode not overlapping a self scanning line and having a portion which overlaps a scanning line adjacent said self scanning line,
an inter-layer insulating film is provided between said pixel electrode and said scanning line, signal line and switching element, and wherein
said inter-layer insulating film has a contact hole through which said switching element and said pixel electrode are electrically connected above a portion of said redundant section, which crosses said signal line at a right angle.

23. A liquid crystal display element comprising:
a switching element in a vicinity of an intersection of a scanning line and a signal line, said scanning line being formed in a layer higher than said signal line; and
a pixel electrode connected to said switching element,
wherein at least one of said scanning line and said signal line has ring-shaped redundant sections, and
an inter-layer insulating film is provided between said pixel electrode and said scanning line, signal line and switching element.

24. A liquid crystal display element comprising:
a switching element in a vicinity of an intersection of a scanning line and a signal line;
an inter-layer insulating film placed on said switching element;
a pixel electrode which is formed on said inter-layer insulating film and connected to said switching element; and
an auxiliary electrode formed on said inter-layer insulating film to cover said switching element.

25. The liquid crystal display element according to claim 24,
wherein said auxiliary electrode is made of the same material as said pixel electrode.

26. The liquid crystal display element according to claim 24,
wherein said auxiliary electrode is connected to a scanning line which is adjacent to said auxiliary electrode.

27. A liquid crystal display device comprising:
an active matrix substrate having a switching element in a vicinity of an intersection of a scanning line and a signal line, and a pixel electrode connected to said switching element, said pixel electrode having an extended section covering a space between adjacent scanning lines;
a counter substrate; and
a liquid crystal sandwiched between said active-matrix substrate and said counter substrate,
wherein said scanning line has ring-shaped redundant sections, and
an inter-layer insulating film is formed between said pixel electrode and said scanning line, signal line and switching element.

28. The liquid crystal display device according to claim 27, further comprising a signal input circuit for inputting a signal of an opposite polarity to a signal line every horizontal period.

29. The liquid crystal display device according to claim 27, further comprising a signal input circuit for inputting signals of opposite polarities to adjacent signal lines, respectively.

30. The liquid crystal display device according to claim 27, further comprising a signal input circuit for inputting signals of opposite polarities to adjacent signal lines, respectively, and for inverting the polarity of the signal every horizontal period.

31. A method for fabricating a liquid crystal display element in which at least one of a scanning line and a signal line has ring-shaped redundant sections, comprising the steps of:
forming a scanning line, a signal line, and a switching element on a substrate;
forming an inter-layer insulating film having a contact hole therein by applying a resin to cover said scanning line, said signal line, and said switching element and to form a predetermined pattern; and
forming a pixel electrode on said inter-layer insulating film and in said contact hole and covering a space between adjacent scanning lines with an extended section of the pixel electrode.

32. The method for fabricating a liquid crystal display element according to claim 31, further comprising the step of applying an ashing treatment to a surface of said inter-layer insulating film.

33. The method for fabricating a liquid crystal display element according to claim 31, further comprising the step of irradiating light on a surface of said inter-layer insulating film.

34. The method for fabricating a liquid crystal display element according to claim 31,
wherein a colored resin is used as a material of said inter-layer insulating film, and
said method further comprises the step of applying a treatment for making the resin transparent after forming said inter-layer insulating film.

35. The method for fabricating a liquid crystal display element according to claim 31, further comprising the steps of:
forming an insulating film to cover said scanning line;

removing said insulating film on a portion of said scanning line; and forming a capacitor line on the portion of said scanning line from which said insulating film is removed using the same material as said signal line simultaneously with the formation of said signal line.

36. The method for fabricating a liquid crystal display element according to claim 35, further comprising the step of applying anodic oxidation to said capacitor line.

37. A method for fabricating a liquid crystal display element including a switching element in a vicinity of an intersection of a scanning line and a signal line, comprising the steps of:

forming said scanning line, signal line, and switching element on a substrate;

forming an inter-layer insulating film having a contact hole therein by applying a resin exhibiting heat resistance at 200° C. or higher temperatures so as to cover said scanning line, signal line and switching element and form a predetermined pattern; and forming a pixel electrode made of ITO on said inter-layer insulating film and in said contact hole, wherein the step of forming said pixel electrode includes a heating treatment at 200° C. or higher temperatures.

38. A liquid crystal display element comprising:

a switching element in a vicinity of an intersection of a scanning line and a signal line; and a pixel electrode connected to said switching element, wherein at least one of said scanning line and said signal line has ring-shaped redundant sections, an inter-layer insulating film is provided between said pixel electrode and said scanning line, signal line and switching element, one extra line is provided for each signal line to be parallel to said signal line, and said signal line and said extra line are connected to each other with a connection line, and said connection line is extended from a connected section of said signal line and said switching element to cover a space between a scanning line on which said switching element is formed and a scanning line adjacent to said scanning line.

39. A liquid crystal display element comprising:

a switching element in a vicinity of an intersection of a scanning line and a signal line; and a pixel electrode connected to said switching element, said pixel electrode having an extended section for covering a top of the switching element, wherein at least one of said scanning line and said signal line has ring-shaped redundant sections, and an inter-layer insulating film is provided between said pixel electrode and said scanning line, signal line and switching element.

* * * * *